(12) United States Patent
Arknaes-Pedersen

(10) Patent No.: US 9,913,034 B2
(45) Date of Patent: Mar. 6, 2018

(54) METHOD FOR DETERMINING A CONNECTION ORDER OF NODES ON A POWERED AUDIO BUS

(71) Applicant: MUSIC Group IP Ltd., Tortola (VG)

(72) Inventor: Lars Arknaes-Pedersen, Viby J (DK)

(73) Assignee: MUSIC GROUP IP LTD, Tortola (VG)

( * ) Notice: Subject to any disclaimer, the term of this patent is extended or adjusted under 35 U.S.C. 154(b) by 0 days.

(21) Appl. No.: 15/256,912

(22) Filed: Sep. 6, 2016

(65) Prior Publication Data

US 2017/0070821 A1 Mar. 9, 2017

(30) Foreign Application Priority Data

Sep. 4, 2015 (DK) .................................. 2015 70573

(51) Int. Cl.
| | |
|---|---|
| *H04R 3/12* | (2006.01) |
| *H04R 29/00* | (2006.01) |
| *H01B 11/06* | (2006.01) |
| *H04R 3/00* | (2006.01) |
| *G06F 13/40* | (2006.01) |
| *H04R 27/00* | (2006.01) |

(52) U.S. Cl.
CPC .............. *H04R 3/12* (2013.01); *G06F 13/40* (2013.01); *H01B 11/06* (2013.01); *H04R 3/007* (2013.01); *H04R 29/007* (2013.01); *G06F 13/4086* (2013.01); *H04R 27/00* (2013.01); *H04R 2420/09* (2013.01)

(58) Field of Classification Search
CPC .... H04R 3/12; H04R 2201/021; H04R 27/00; H04R 1/028; H04R 1/02; H04R 1/323; H04R 2225/51; H04R 25/554; H04R 3/007; H04R 5/02; H04R 1/021; H04R 1/026; H04R 1/345; H04R 1/403; H04R 2201/40; H04R 2225/55; H04R 2420/07
USPC .... 381/66, 120, 300, 307, 391, 58, 73.1, 77, 381/103, 105, 107, 123, 28, 315, 370, 381/386, 395, 59, 71.6, 79, 86, 94.1
See application file for complete search history.

(56) References Cited

U.S. PATENT DOCUMENTS

| | | | |
|---|---|---|---|
| 5,406,634 A | | 4/1995 | Anderson |
| 5,818,948 A | * | 10/1998 | Gulick ..................... H04R 3/00 381/2 |
| 6,108,426 A | * | 8/2000 | Stortz ................... G06F 1/3203 381/124 |
| 2005/0135637 A1 | | 6/2005 | Obranovich |
| 2010/0260348 A1 | | 10/2010 | Bhow |
| 2011/0096940 A1 | * | 4/2011 | Butler ..................... H04R 3/12 381/77 |
| 2011/0216934 A1 | * | 9/2011 | Elias ..................... H05K 5/0247 381/394 |
| 2012/0093325 A1 | * | 4/2012 | Tang ....................... H04R 3/12 381/28 |
| 2012/0140936 A1 | | 6/2012 | Bonnick |

(Continued)

FOREIGN PATENT DOCUMENTS

GB 2353448 A 2/2001

*Primary Examiner* — Akelaw Teshale
(74) *Attorney, Agent, or Firm* — Cantor Colburn LLP

(57) ABSTRACT

A method for determining a connection order of nodes on a powered audio bus by having the nodes draw power from the powered audio bus, measure the power consumed downstream, determine who is the last node on the bus, and transmit an identifier of the last node to the bus driver.

20 Claims, 14 Drawing Sheets

(56) References Cited

U.S. PATENT DOCUMENTS

Figure 1:
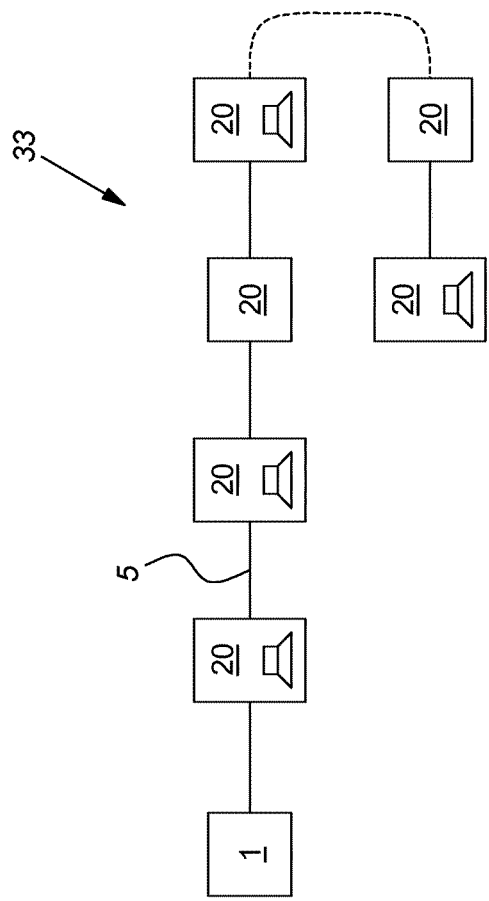

| | | |
|---|---|---|
| 2012/0284441 A1 | 11/2012 | Landman |
| 2013/0156198 A1 | 6/2013 | Kim |
| 2013/0288802 A1 | 10/2013 | Lambourne |
| 2014/0025999 A1 | 1/2014 | Kessler |
| 2014/0101351 A1* | 4/2014 | Hooper .................. G06F 13/42 710/110 |
| 2014/0247892 A1 | 9/2014 | Williams |
| 2015/0104037 A1 | 4/2015 | Lee |
| 2015/0223002 A1 | 8/2015 | Mehta |
| 2016/0334416 A1 | 2/2016 | Chavez |

* cited by examiner

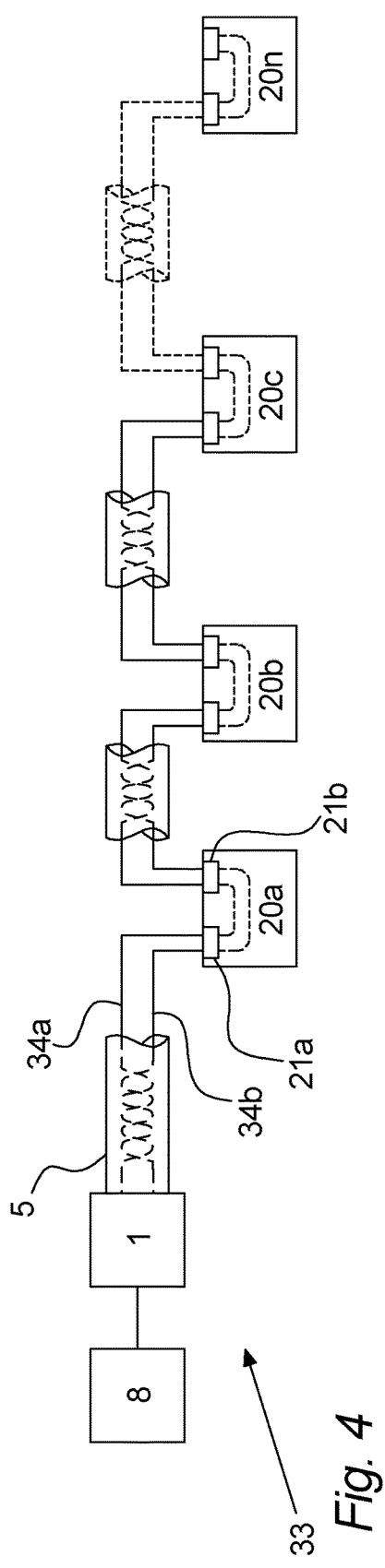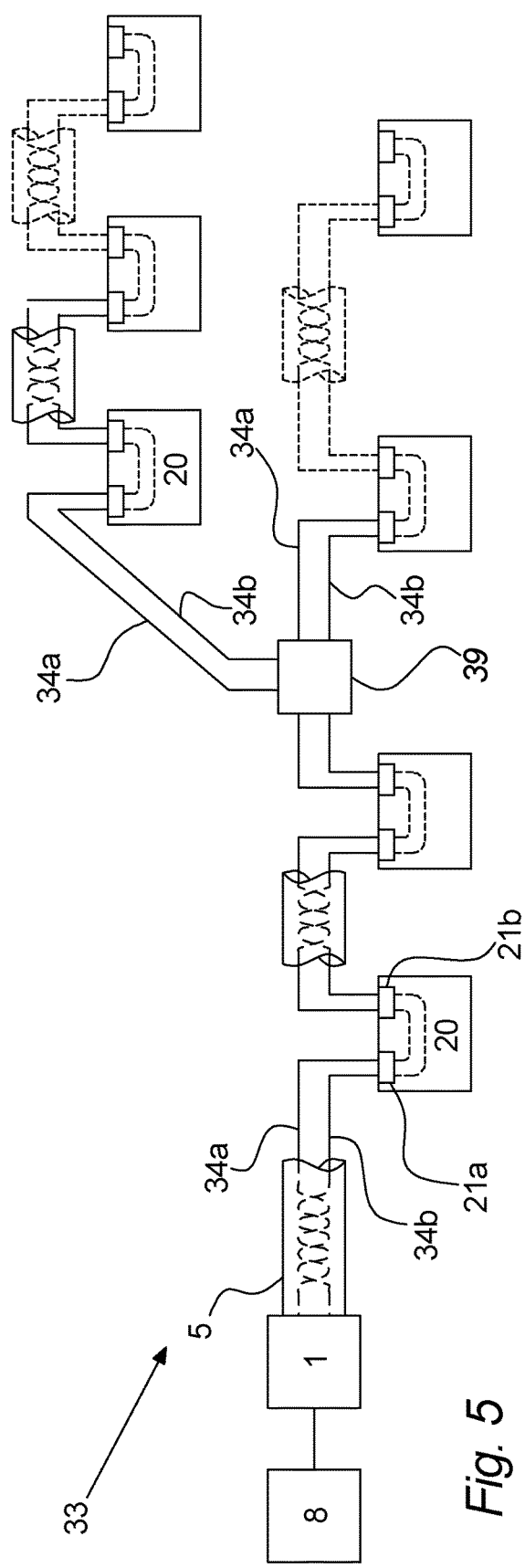

METHOD FOR DETERMINING A CONNECTION ORDER OF NODES ON A POWERED AUDIO BUS

CROSS-REFERENCE TO RELATED APPLICATIONS

This application is related to and claims the benefit of Danish Patent Application No. DK201570573 filed on Sep. 4, 2015, the entire contents of which are herein incorporated by reference.

FIELD OF THE INVENTION

The present invention relates to powered loudspeaker buses.

BACKGROUND OF THE INVENTION

Installation loudspeaker systems based on loudspeaker buses with intelligent drivers and nodes are more complex than traditional 70V/100V systems. However, in order to utilise a number of smart and advanced possibilities, the bus driver will have to be able to detect the nodes connected to the bus, for example in terms of which nodes or how many nodes. The communication between bus driver and nodes required to obtain such information or unlock smart features are in many instances difficult to initialize without extensive and error-prone assistance from an installer or other technician, for example involving remembering to terminate the installed transmission cable, terminating the cable at the right place and only the right place, feeding the driver with details about the nodes, for example addresses and models, etc.

SUMMARY OF THE INVENTION

The invention relates in one aspect to a method for determining a connection order of at least two nodes on a powered audio bus, the method comprising the steps of:
providing a powered audio bus;
providing nodes connected to said powered audio bus, each of the nodes comprising:
  a node processing unit and a node memory, the node memory being arranged to store at least a node identifier;
  a node receiver and a node transmitter arranged to receive and transmit communication on said powered audio bus;
  a bus power monitoring unit;
  a utility unit arranged to provide a utility function of said node, the utility unit of at least one of the nodes comprising at least one loudspeaker and at least one amplifier arranged to drive said loudspeaker based on control information and audio information received from said powered audio bus by said node receiver; and
  a power converter arranged to convert power from said powered audio bus to supply power to at least partly the node processing unit, the node receiver, the node transmitter and the utility unit;
providing a bus driver connected to said powered audio bus at a bus driver portion of said powered audio bus, the bus driver being arranged to feed control information and audio information into the powered audio bus, the bus driver comprising a driver processing unit and a driver memory, the driver memory being arranged to store at least said node identifiers for said nodes;
providing a bus power supply connected to said powered audio bus at said bus driver portion of said powered audio bus, the bus power supply being arranged to feed power into the powered audio bus;
arranging for a subset of the nodes to draw power from said bus power supply via said powered audio bus;
using said bus power monitoring units of said subset to determine a farthest node as one node of said subset which is connected to said powered audio bus farther away from said bus driver than any other node of said subset;
using said node transmitter and node receiver of said determined farthest node to communicate a node identifier with said bus driver so that a node identifier for said determined farthest node is stored in said node memory and said controller memory.

Thereby is achieved an advantageous way to determine the sequence of specific nodes along a powered audio bus or a part of such sequence or characteristics of the order in which the nodes are connected. The thereby obtained ability of determining the last node on the line may for example be particularly interesting in various embodiments. Another highly interesting possibility in various embodiments is the thereby obtained ability to enumerate a string of unknown nodes with respect to individual identifiers as well as the specific order or sequence in which they are connected.

According to embodiments of the invention, preferably the major part or even all the nodes are active loudspeaker nodes, i.e. nodes comprising an amplifier and loudspeaker as part of their utility unit, for example for use in public address systems, i.e. so-called PA systems, background music or announcement systems built into hotels, shopping centres, restaurants and bars, sport centres, etc. In many applications of such systems, it is highly beneficial to know which specific loudspeaker node is connected to the bus cable at which position, for example in order to facilitate troubleshooting and physically servicing or replacing a specific loudspeaker of which only an identifier such as e.g. a serial number or node address is known.

In many applications of such audio systems, it is also desired to be able to address the loudspeakers individually or in groups by spatial or logical zones, in where it is highly beneficial to be able to enumerate the loudspeakers automatically by embodiments of the present invention to identify individual identifiers or addresses, which may then be addressed directly or assigned to groups for zone addressing.

A further advantageous application of embodiments of the present invention is the identification of the farthest node on the bus, i.e. the node to which no next node is connected. This is highly relevant when the powered audio bus is used to communicate high quality audio and control information requiring high data rates, which in turn requires that the bus is terminated to its characteristic impedance at the end node to avoid reflection and destruction of the data communication. By determining the end node of the bus, the bus driver may in various embodiments facilitate that the termination is properly applied, e.g. by informing a user, e.g. an installer, or, according to a particularly advantageous embodiment, by instructing the end node to automatically terminate the bus.

Various embodiments of the present invention may thus be applied for determining a node to terminate a powered audio bus, for determining a last node on a powered audio bus, for enumerating at least two nodes, preferably all nodes, on a powered audio bus, for determining a sequence or connection order of at least two nodes, preferably all nodes, on a powered audio bus, or for identifying at least two nodes, preferably all nodes, on a powered audio bus.

By a bus driver portion of the powered audio bus is referred to any part of the powered audio bus to which the bus driver is connected and which does not comprise any nodes. In other words, a bus driver portion may typically be one end of the bus, extending from the end to the first node on the bus. If the bus driver is connected between two nodes on a bus, the bus driver portion extends from one of these nodes past the bus driver and to the other of these nodes. By the term farthest node from the bus driver is referred to a node on the bus which has no downstream connection to further nodes within the subset of nodes currently being processed.

The bus power supply is preferably integrated with the bus driver, so that only one box with only one connector is connected to, typically, an end of the bus. The power fed to the powered audio bus by the power supply is preferably a DC power.

It is noted, that even though high throughput communication is typically unachievable on an un-terminated bus, it is normally possible to communicate with more simple and slow techniques. This is utilized in the step of communicating a node identifier with said bus driver. The communication of a node identifier may involve the node reading its serial number or other identifier from its memory and transmitting it to the bus driver, or that the bus driver selects, generates or reads an identifier for the particular node, which is transmits to the node. In both scenarios, the end result is that both the node and the bus drive have stored the same identifier for that particular node in their memories.

By the method the bus driver gets to recognize and communicate with the farthest node on the bus (or at least in the subset). However, the method facilitates enumerating more or preferably all nodes on the bus. A complete or partial enumeration may for example be achieved by repeating the method with a new subset not including the already recognized node. Another approach to complete or partial enumeration of the nodes involves analyzing the power or current measurements from all the nodes (which can be done in the nodes or the nodes may transmit their observations via communication robust to a non-terminated transmission line), and by comparing the downstream current measured by the individual nodes, determine their connection order as the node with the highest downstream consumption being nearest to the bus driver, and the node with lowest or none downstream consumption being farthest from the bus driver, and any further nodes being ordered there between.

An advantageous embodiment is obtained when said powered audio bus is implemented by one pair of unshielded or shielded twisted wire cable.

According to an advantageous embodiment of the invention, such cable facilitates two conductors in total i.e. power, control and audio are transmitted simultaneously via these two wires. In case the cable comprises a shield, such shield may be used as signal (power and audit) carrying conductor. As an example, a suitable cable could be TP (TP: twisted pair) or UTP (UTP: unshielded twisted pair) with two conductors, or e.g. one pair of conductors from a Category 5 network cable, cable with a wire diameter of 24 AWG (AWG: American wire gauge), conventional loudspeaker installation cable, etc.

Existing node/loudspeaker networks may be retrofitted i.e. old speakers may be substituted with new speakers according to the invention without the need of also substituting the old cables. Further, an existing node/loudspeaker network may be extended with appropriate cables, such appropriate cable may not be of the same type as the existing network for the present invention to be applied to such existing network.

An advantageous embodiment is obtained when said powered audio bus is implemented by a two conductor cable having a characteristic impedance in the range of 50Ω to 150Ω.

This is advantageous in that cable in this range of impedance has proven to facilitate the highest quality of audio transmittal. Cables having a characteristics impedance of 100Ω are preferred.

An advantageous embodiment is obtained when said nodes are connected to said powered audio bus in a daisy-chain configuration.

A daisy chain configuration should be understood as a wiring scheme in which multiple devices are wired together in sequence or in a ring. This is explained in further details below.

An advantageous embodiment is obtained when said powered audio bus comprises at least two bus driver portions, e.g. one at each end of the powered audio bus, and individual bus driver ports of one or more bus drivers are connected to each of the at least two bus driver portions, thereby providing an audio system with redundancy, e.g. as a ring topology.

For reliability reasons, in particular relevant for critical audio systems such as evacuation systems, it is highly advantageous and often required to provide redundancy against failure. By connecting different parts of one powered audio bus, e.g. each end of the bus, to several bus driver ports, e.g. as a ring topology, it is avoided that a part of the powered audio bus can be amputated from the bus driver by cable break, disconnection of a node, etc. In case of for example a cable break between two nodes of the powered audio bus, each of the now separate parts of the powered audio bus is still connected to a bus driver. One bus driver may comprise more than one bus port to drive several powered audio buses—or to provide redundancy in ring topology-like configurations by using two or more bus ports to drive one powered audio bus, in which case preferably only one port is active at a time as long as the bus is intact. The redundancy can also be provided by several bus drivers connected to the same powered audio bus, in which case the bus drivers are configured by a user or by mutual communication to only have one of them active at a time as long as the bus is intact. In case of using two or more bus drivers for redundancy they can be located in different physical locations for improved protection against local fire, power loss, building collapses, etc.

An advantageous embodiment is obtained when at least two bus driver ports are connected to said powered audio bus; wherein said method comprises configuring all but one of said at least two bus driver ports to be inactive when said powered audio bus is intact, and configuring up to one of said at least two bus driver ports to be active for each separate part of said powered audio bus when said powered audio bus is broken; and wherein said method comprises re-performing said method of determining a connection order for each active bus driver when said powered audio bus is broken.

An advantageous embodiment is obtained when said bus power monitoring unit is connected to said powered audio bus in series.

This is advantageous in that the preferred measurement of the bus power monitoring unit is current hence e.g. a current sensing resistor could be the first (or the last) component through which current consumed by a first node and any subsequent nodes passes through the first node. As an alternative to a sensing resistor, a Hall sensor (e.g. Allegro ACS712) or an inductive measuring coil such as a Rogowski coil may be used for measuring the current running through the first node.

An advantageous embodiment is obtained when said bus power monitoring unit is arranged to monitor a power-related information related to current, voltage or power selected from the list of level, difference, exceeded threshold, slope, frequency, real part, imaginary part, phase, periodicity, superposed or encoded information, or any combination thereof.

This is advantageous in that from such power-related information the current consumption of the first and or subsequent nodes can be derived. Hence if any such information is available the current sensor may be superfluous or measurements hereof may be validated.

An advantageous embodiment is obtained when said bus power monitoring unit of a node is arranged to monitor a power related information on both sides of said node.

By monitoring e.g. current, e.g. by current sense resistors, on both side of the node, an advantageous embodiment is obtained, which facilitates monitoring power related information, e.g. current consumption, about the node itself as the difference between the two measurements, and determining which side is downstream as the smallest measurement, in the case of e.g. current.

In practice is thereby enabled an immunity to reversing upstream and downstream connectors, as the bus power monitoring unit will still be able to provide the information needed in order to identify the node farthest from the bus driver. As the other functions of the node is coupled in parallel on the bus, they are also immune to reversing upstream and downstream connections.

An audio bus node which do not have specific upstream and downstream sides is highly relevant to especially audio bus installers, as it releases them from the hassle of keeping track of which wires are up- and down-stream, and thereby removes a common error cause from the installation process.

An advantageous embodiment is obtained when said bus power monitoring unit of a node is arranged to monitor a power related information on two conductors of said powered audio bus.

By monitoring e.g. current, e.g. by current sense resistors, on two conductors of powered audio bus, which preferably consists of only two conductors and preferably is DC powered, an advantageous embodiment is obtained, which facilitates monitoring power related information, e.g. current consumption, on the conductor with the potential closest to ground potential, regardless of how the conductors have been connected to the node.

In other words, this embodiment enables an immunity to reversed high and low potential conductors, i.e. e.g. VCC and ground conductors. In a preferred embodiment, the power converter is also arranged to be tolerant to reversed polarity, e.g. by providing it with a diode bridge, and the data communication is performed by a balanced type protocol, thereby making the entire node immune to reversed polarity.

An audio bus node with polarity tolerance is highly relevant to especially audio bus installers, as it releases them from the hassle of keeping track of which wires are high and low potential, and thereby removes a common error cause from the installation process.

In a preferred embodiment, the node comprises both immunity to up/downstream reversal as well as polarity reversal as described above, making it practically impossible for the installer to make a mistake when connecting the preferably four conductors of the bus in the preferably four connectors of the node, which is a very advantageous achievement, and at the same time makes the determining the farthest node or enumerating all the nodes more robust.

An advantageous embodiment is obtained when the arranging for a subset of the nodes to draw power from said bus power supply comprises arranging the node processing units to cause a predetermined power consumption in the respective nodes.

This is advantageous in that by such predetermined power consumption from nodes the bus driver may derive information of where in the node network the respective nodes are located. Further this may facilitate that the identification of the farthest node is identified in one test cycle as an alternatively to identification of the nodes one after the other i.e. in a plurality of test cycles.

An advantageous embodiment is obtained when the predetermined power consumption comprises a varying current.

An advantageous embodiment is obtained when the predetermined power consumption is established by the utility units of the nodes.

An advantageous embodiment is obtained when the predetermined power consumption is established by arranging a node amplifier and loudspeaker of the utility unit of a node to consume power by processing a test signal audibly or inaudibly.

An advantageous embodiment is obtained when the test signal is generated or stored in the node.

An advantageous embodiment is obtained when the test signal is a waveform with a frequency in the range of 0.1 to 10 Hz.

This is advantageous in that such test signal is then not in the audible area of humans and thereby human presence in the room(s) comprising nodes of a powered audio bus the order of which is to be determined is not affected by such test signal.

As an alternative to the advantageous AC test signal a DC test signal may be used if the idle consumption of the nodes is calibrated to such DC test signal.

An advantageous embodiment is obtained when the predetermined power consumption causes a consumption in the node with an RMS power in the range 1-10 W.

In a preferred embodiment, the powered audio bus is powered with 48 VDC, whereby a power in the range 1-10 W means the node draws a current in the range of approximately 20 mA to 200 mA.

An advantageous embodiment is obtained when the predetermined power consumption is different among the nodes.

In an embodiment the predetermined power consumption is used as an identifier for enumeration or verification of the nodes thereby an automatic order of nodes is obtained fast and without the risk of human interruption and thereby sources of error.

An advantageous embodiment is obtained when the predetermined power consumption is varying and synchronized between the nodes.

In a preferred embodiment the predetermined power consumption is a varying power signal, thereby improving verification and robustness against coincidental power consumption being regarded part of the enumeration or ordering of the nodes. In order to not have the varying power consumption from the different nodes neutralizing or obscuring each other, a preferred embodiment is arranged to facilitate synchronization of the predetermined power consumption. The synchronization may be provided by various schemes, for example having the nodes aligning to each other according to known algorithms, or having the bus driver timing or regulating the power consumption, e.g. by encoding timing codes into the powered audio bus current, preferably according to a transmission protocol interpretable by the node receiver.

An advantageous embodiment is obtained when at least one of the nodes comprise a controllable transmission line termination unit.

The transmission line termination unit is preferably controllable so that it can be inserted and removed when needed. Preferably the bus driver is in control by instructing the node when it should insert the termination unit.

An advantageous embodiment is obtained when the method comprises a step of instructing the farthest node to insert a transmission line termination unit on the powered audio bus.

A controllable transmission line termination unit is advantageous in that such termination unit may be connected or disconnected at the node but controlled from a central unit such as the bus driver. Hence when the farthest node is determined the bus controller can ask the farthest node to connect the termination unit and thereby the transmission line is terminated facilitating a balanced network of nodes suitable for high quality audio distribution.

An advantageous embodiment is obtained when the transmission line termination unit comprises at least one impedance and at least one a capacitance, the impedance value corresponding roughly to a characteristic impedance of the transmission line.

The termination unit is preferably implemented with a resistor as impedance, where the resistor or entire termination unit is controlled by a switching device facilitating the connection/disconnection of the termination unit. Hence in the situation a node network is expanded the termination unit of the past farthest node is disconnected and the termination unit of the new farthest node is connected. All this controlled from a central unit such as the bus driver facilitating a balanced network of nodes suitable for high quality audio distribution.

An advantageous embodiment is obtained when one of the nodes comprises the bus driver.

According to an advantageous embodiment of the invention, at least one node is an extended node in that such extended node comprises the bus driver. A node network comprising such extended node is advantageous in that no additional components than nodes are necessary for creating an intelligent node network. Further the extended node and thereby the bus driver may be located in the one of the ends of the node network (also referred to as daisy chain) which is most convenient e.g. in relation to service and installation.

An advantageous embodiment is obtained when the node comprising a first and second node-bus interface.

Advantageous in that the first and second node-bus interfaces is implemented in the node in such way that it installation of the node cannot be done wrong i.e. the first bode-bus interface can be connected with both the upstream and downstream end of the powered audio bus. This reduces the risk of installation errors when installing the audio system.

In addition to the fact that the mounting of the powered audio bus to the node is free the mounting of the two conductors (physically constituting the powered audio bus) to the node-bus interface is also free. Adding a further degree of user-friendliness to the installation of the audio system An advantageous embodiment is obtained when the first and second node current sensor does not measure current consumption of the node.

This is advantageous in that then only upstream or downstream current consumption is measured i.e. consumption of nodes located upstream or downstream on the powered audio bus.

An advantageous embodiment is obtained when the first and second node current sensor facilitates measuring voltage of the powered audio bus.

An advantageous embodiment is obtained when said method further comprises the steps of:
  excluding said farthest node from said subset;
  repeating said method from the step of arranging for the subset of the nodes to draw power from said bus power supply until all nodes have been excluded from the subset.

According to this preferred embodiment of the invention, an iterative approach is applied, where each iteration identifies the farthest node, stores information about it, and excludes it from the next iteration. Each iteration thereby reduces the subset by one node, until the subset only contains the node closest to the bus driver, which is then identified as node closest to the bus driver. Hence in this way each node in the subset is registered according to its location/position in the network relative to the bus driver and thereby both the closest and the farthest node is identified.

An advantageous embodiment is obtained when the bus power supply is a DC power supply An advantageous embodiment is obtained when one of the nodes comprise the bus power supply.

This is advantageous in that one extended node then may comprise both bus driver and bus power supply and thereby when installed the bus/network is both powered and controllable.

An advantageous embodiment is obtained when the powered audio bus is further supplied with power from a bus power injector.

A bus power injector is advantageous especially in the large networks where considerations of size and price of bus power supply, voltage drop, etc. is relevant. Hence is some situations the combination of a standard bus power supply and a bus power injector may provide the altogether cheapest network configuration.

Further a bus power injector is advantageous in that standard components (one size bus power supply and bus power injector) may be provided, hence as node network is up scaled additional bus power injectors are used to facilitated the necessary power to the node network.

An advantageous embodiment is obtained when the node processing unit, the node receiver and the node power monitoring unit is implemented in one node processing module.

It is advantageous to integrate the units facilitating these operations in one physical enclosure in that the number of individual components are then reduces. Beside the mentioned components other not mentioned components may also be implemented in the node processing unit or together in other units.

An advantageous embodiment is obtained when the node transmitter enables communication from the node to the bus driver.

The node may preferably be able to transmit information to the driver in connection with the process of determining a connection order of nodes, in order to for example provides its observations, identifier, etc. In a preferred embodiment, this communication is performed by a protocol or technique not requiring the powered audio bus to be terminated, as transmission line termination may in a preferred embodiment be the result of the process and therefore not available during the process. The communication may for example be a simple, low-rate communication such as FSK.

The invention relates in one aspect to a loudspeaker system comprising
- a powered audio bus;
- nodes connected to the powered audio bus, each of the nodes comprising:
  - a node processing unit and a node memory, the node memory being arranged to store at least a node identifier;
  - a node receiver and a node transmitter arranged to receive and transmit communication on said powered audio bus;
  - a bus power monitoring unit;
  - a utility unit arranged to provide a utility function of said node, the utility unit of at least one of the nodes comprising at least one loudspeaker and at least one amplifier arranged to drive said loudspeaker based on control information and audio information received from said powered audio bus by said node receiver; and
  - a power converter arranged to convert power from said powered audio bus to supply power to at least partly the node processing unit, the node receiver, the node transmitter and the utility unit;
- a bus driver connected to said powered audio bus at a bus driver portion of said powered audio bus, the bus driver being arranged to feed control information and audio information into the powered audio bus, the bus driver comprising a driver processing unit and a driver memory, the driver memory being arranged to store at least said node identifiers for said nodes; and
- a bus power supply connected to said powered audio bus at said bus driver portion of said powered audio bus, the bus power supply being arranged to feed power into the powered audio bus;
- wherein the nodes are arranged to draw power from said bus power supply via said powered audio bus upon instruction from said bus driver or upon their connection order not being identified by said bus driver; thereby forming a subset of said nodes drawing power in an occasion;
- wherein the bus power monitoring units are arranged to determine a farthest node as one node of said subset of said nodes which is connected to said powered audio bus farther away from said bus driver than any other node of said subset;
- wherein the node transmitter and node receiver of a node upon being determined as said farthest node are arranged to communicate a node identifier with said bus driver, so that a node identifier for said farthest node can be stored in said node memory and said controller memory.

The loudspeaker system may advantageously be combined with any of the above-described features and embodiments to achieve the advantages described above.

The invention relates in one aspect to a method of retrofitting nodes and a bus driver to an existing loudspeaker installation cable to transform it into a powered audio bus, the method comprising
- providing a powered audio bus by
  - connecting nodes to a previously installed loudspeaker installation cable, each of the nodes comprising:
    - a node processing unit and a node memory, the node memory being arranged to store at least a node identifier;
    - a node receiver and a node transmitter arranged to receive and transmit communication on said powered audio bus;
    - a bus power monitoring unit;
    - a utility unit arranged to provide a utility function of said node, the utility unit of at least one of the nodes comprising at least one loudspeaker and at least one amplifier arranged to drive said loudspeaker based on control information and audio information received from said powered audio bus by said node receiver; and
    - a power converter arranged to convert power from said powered audio bus to supply power to at least partly the node processing unit, the node receiver, the node transmitter and the utility unit;
  - connecting a bus driver to said installation cable at a bus driver portion of said powered audio bus, the bus driver being arranged to feed control information and audio information into the powered audio bus, the bus driver comprising a driver processing unit and a driver memory, the driver memory being arranged to store at least said node identifiers for said nodes; and by
  - connecting a bus power supply to said installation cable at said bus driver portion of said powered audio bus, the bus power supply being arranged to feed power into the powered audio bus;
- arranging for a subset of the nodes to draw power from said bus power supply via said powered audio bus;
- using said bus power monitoring units of said subset to determine a farthest node as one node of said subset which is connected to said powered audio bus farther away from said bus driver than any other node of said subset; and
- using said node transmitter and node receiver of said determined farthest node to communicate a node identifier with said bus driver so that a node identifier for said determined farthest node is stored in said node memory and said controller memory.

Loudspeaker systems of the present invention is highly advantageous and convenient for retrofitting as they in preferred embodiments fully support being installed with traditional loudspeaker installation cables, e.g. UTP cables. Thereby an existing loudspeaker installation for example based on a 70/100 V system, may be upgraded to a powered audio bus system as described herein simply by substituting the speakers with nodes, and the old driver with a bus driver as described. The cable typically needs not be renewed or re-installed, which for most buildings and installations would be the most cumbersome task in relation to renewing an audio system.

Advantageous embodiments of the retrofitting method are achieved when combining the retrofitting method with one or more of the features and embodiments described above, e.g. with respect to a method of determining a connection order of nodes.

THE DRAWINGS

Figure 2:
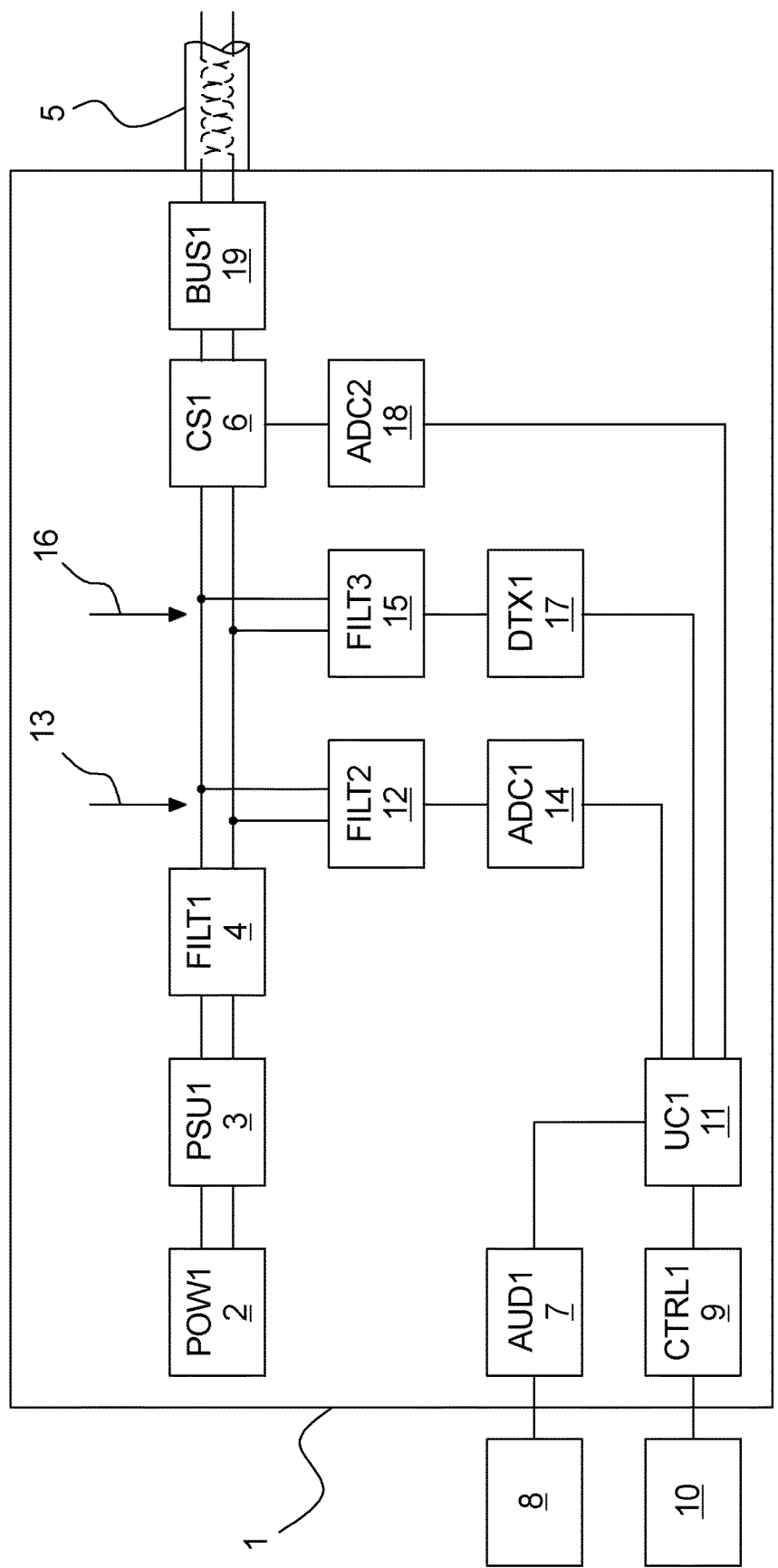
Figure 3:
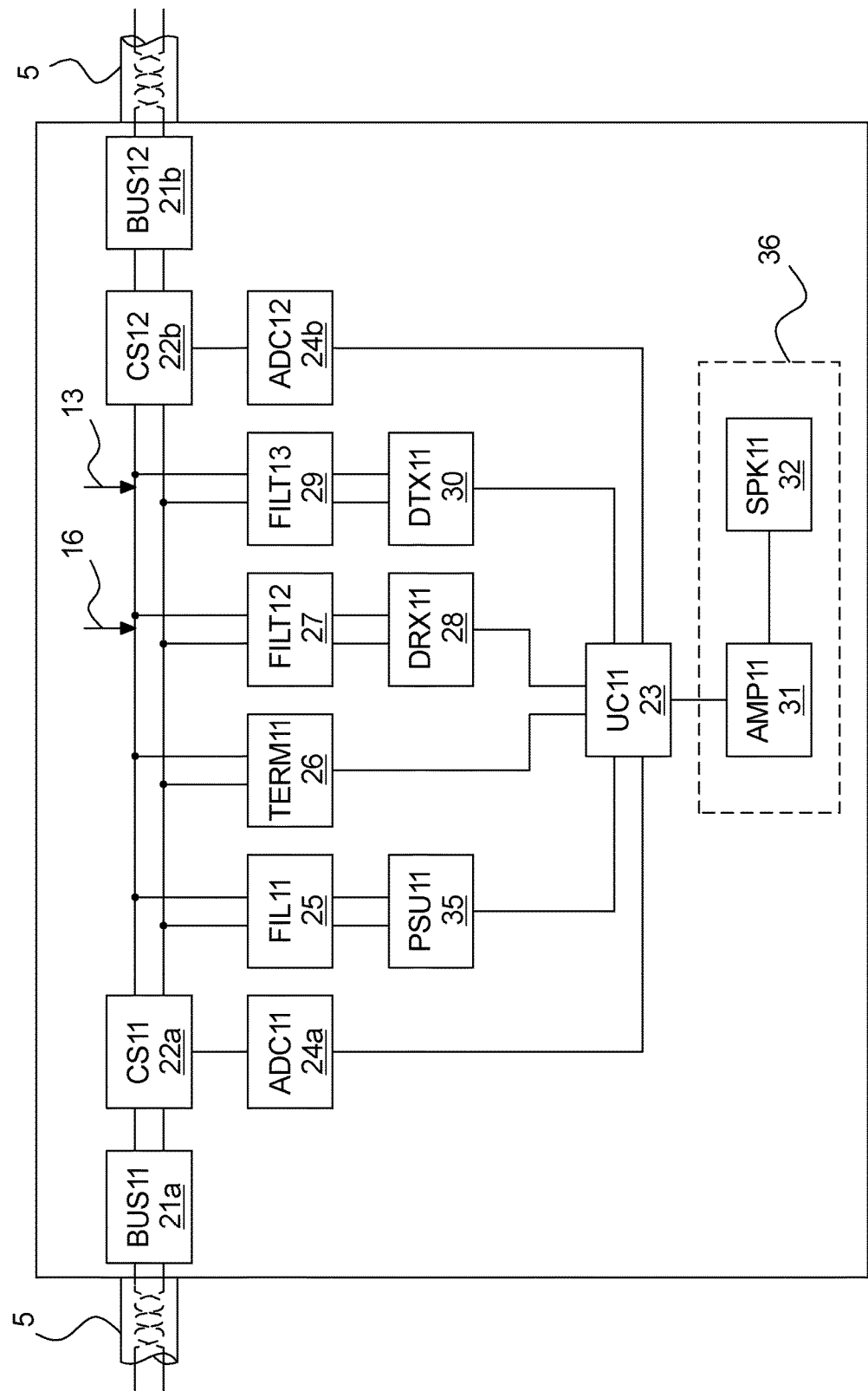
Figure 6:
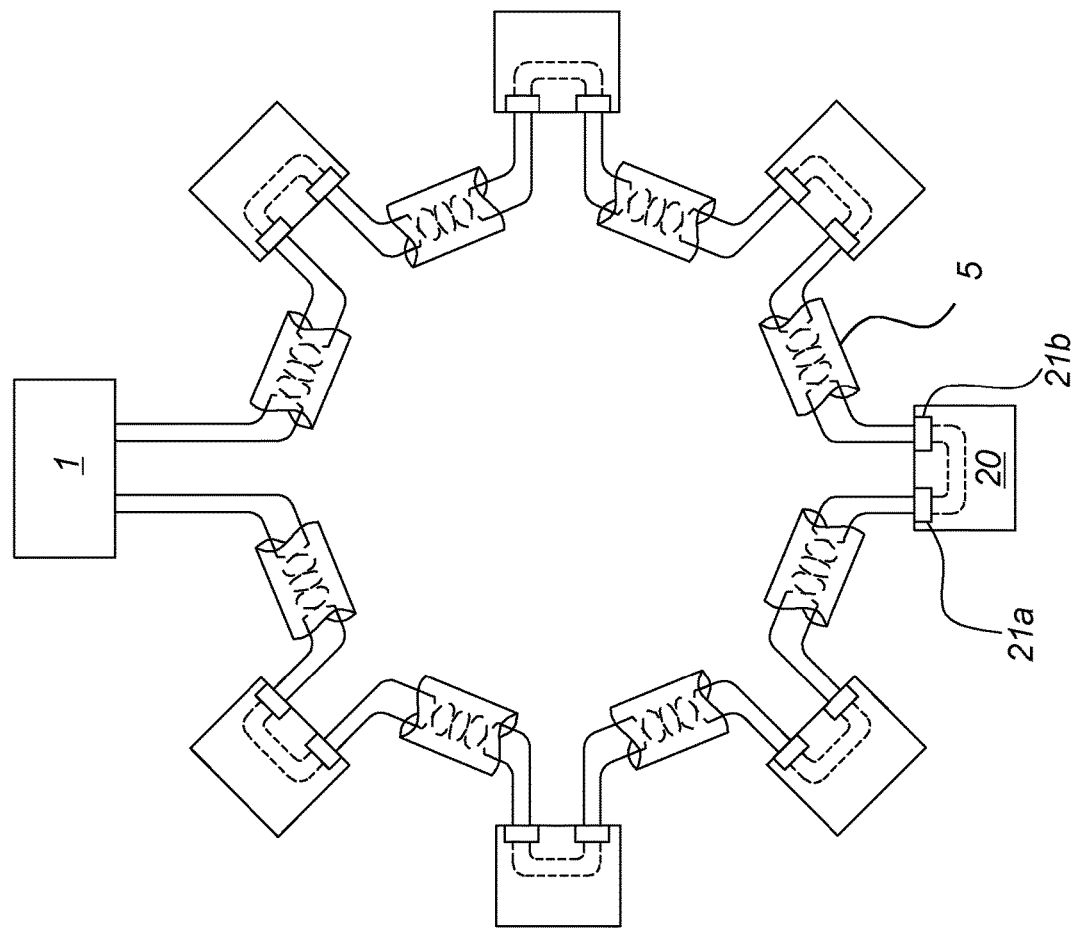
Figure 7:
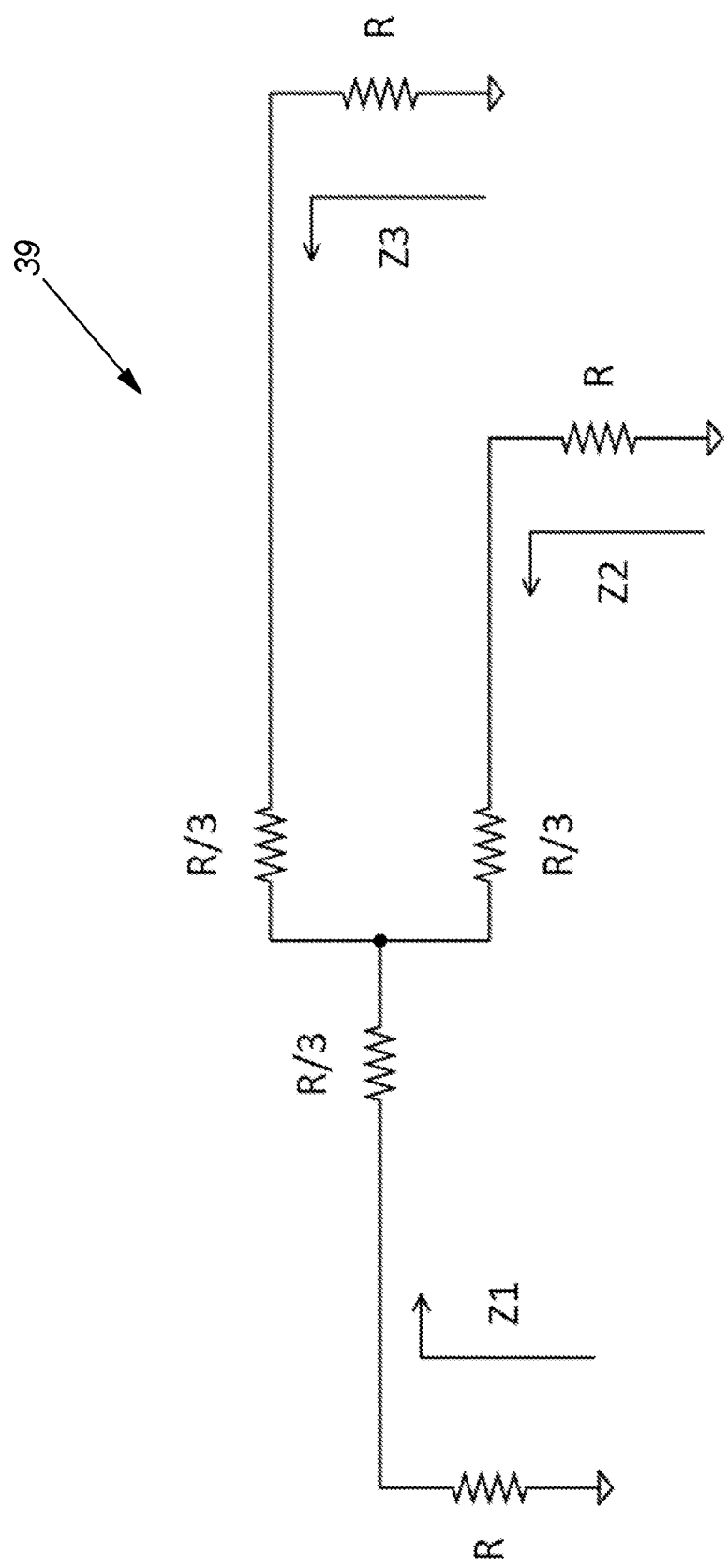
Figure 8:
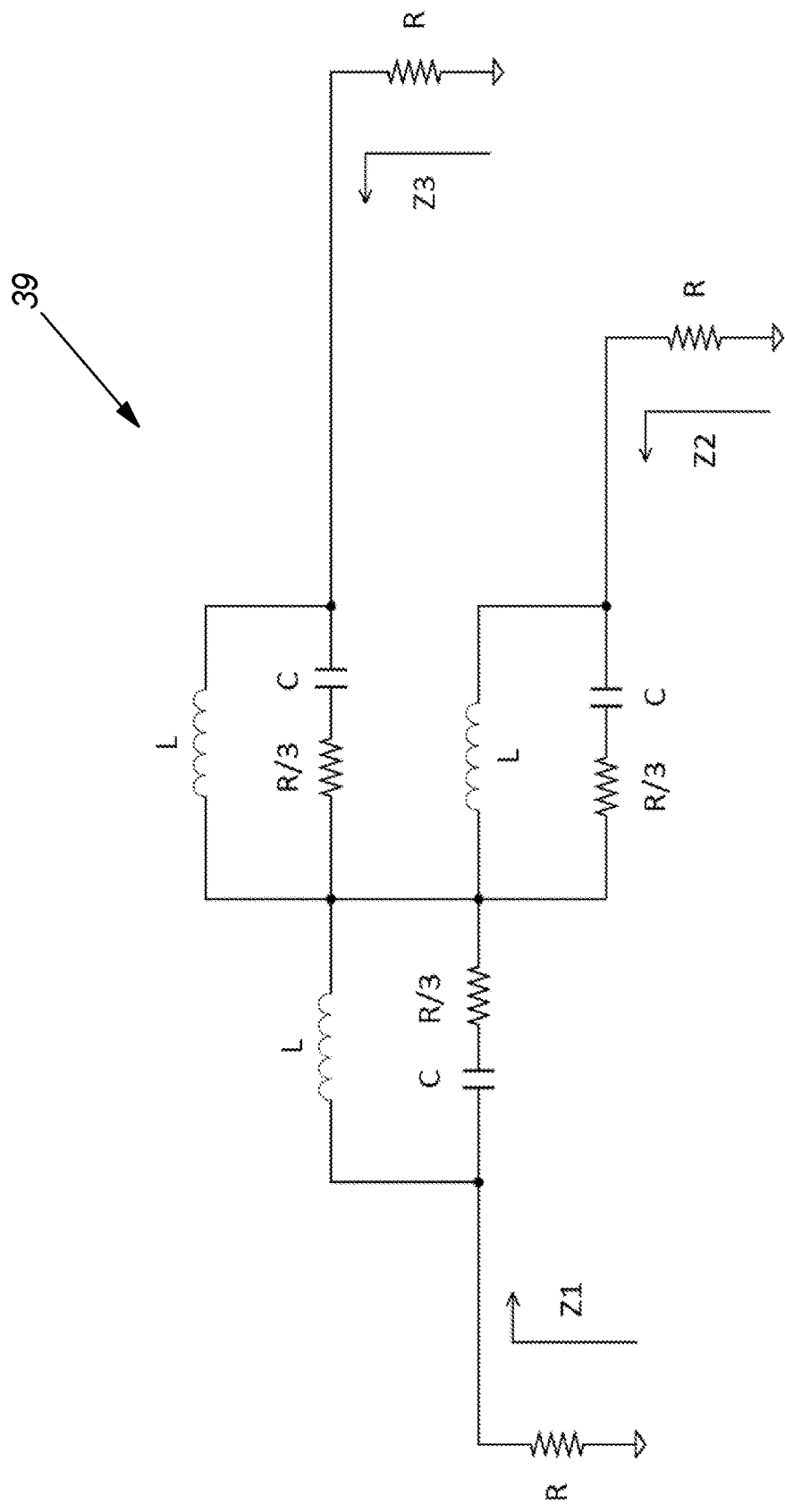
Figure 9:
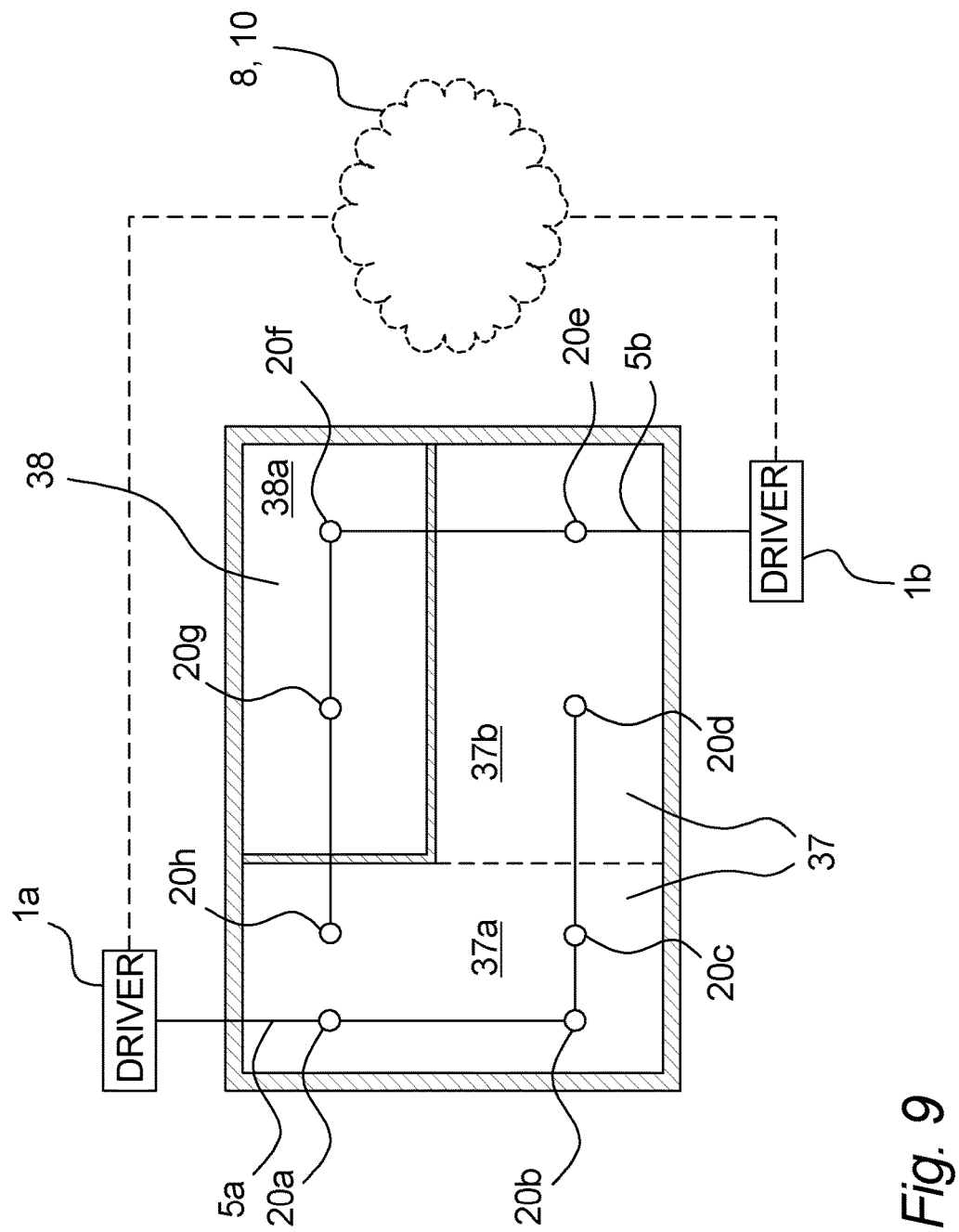
Figure 10A:
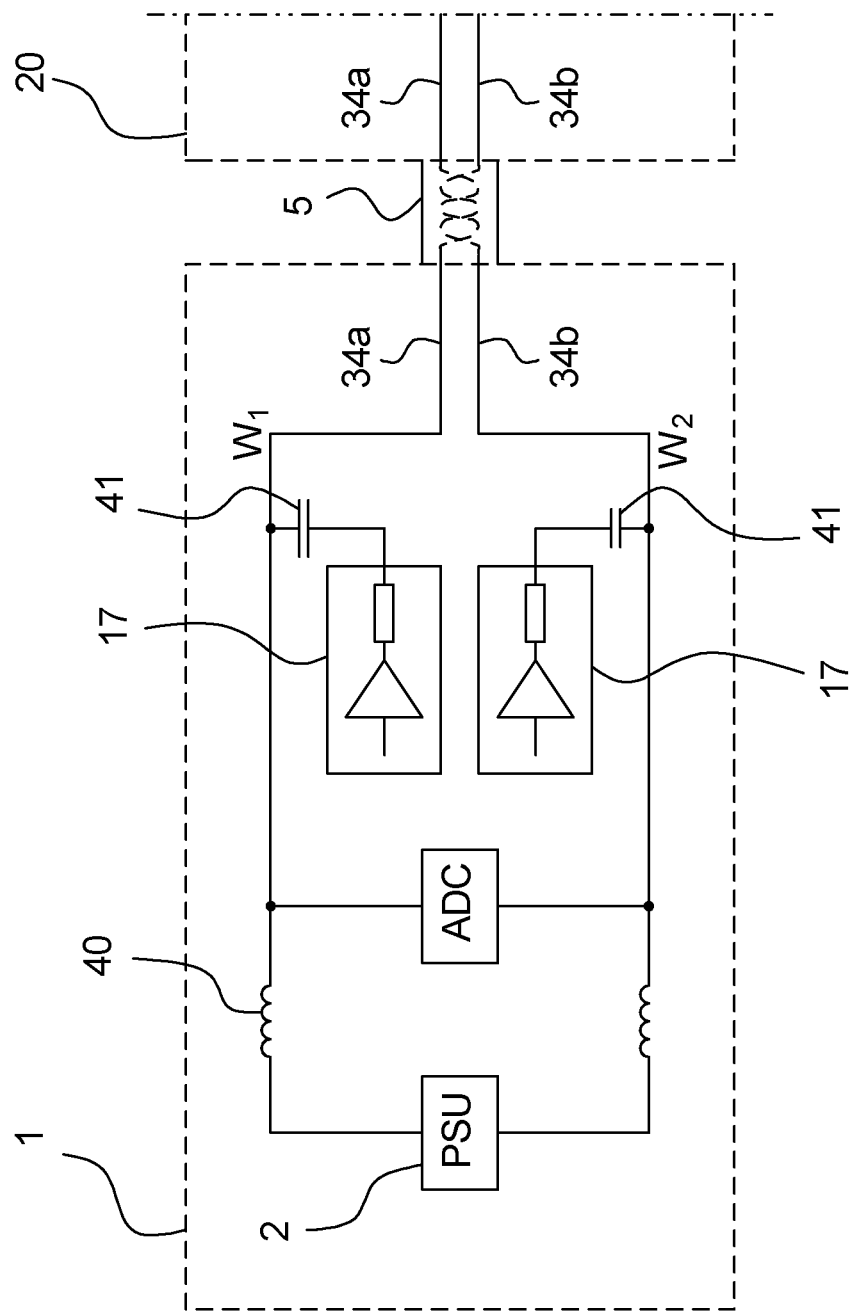
Figure 10B:
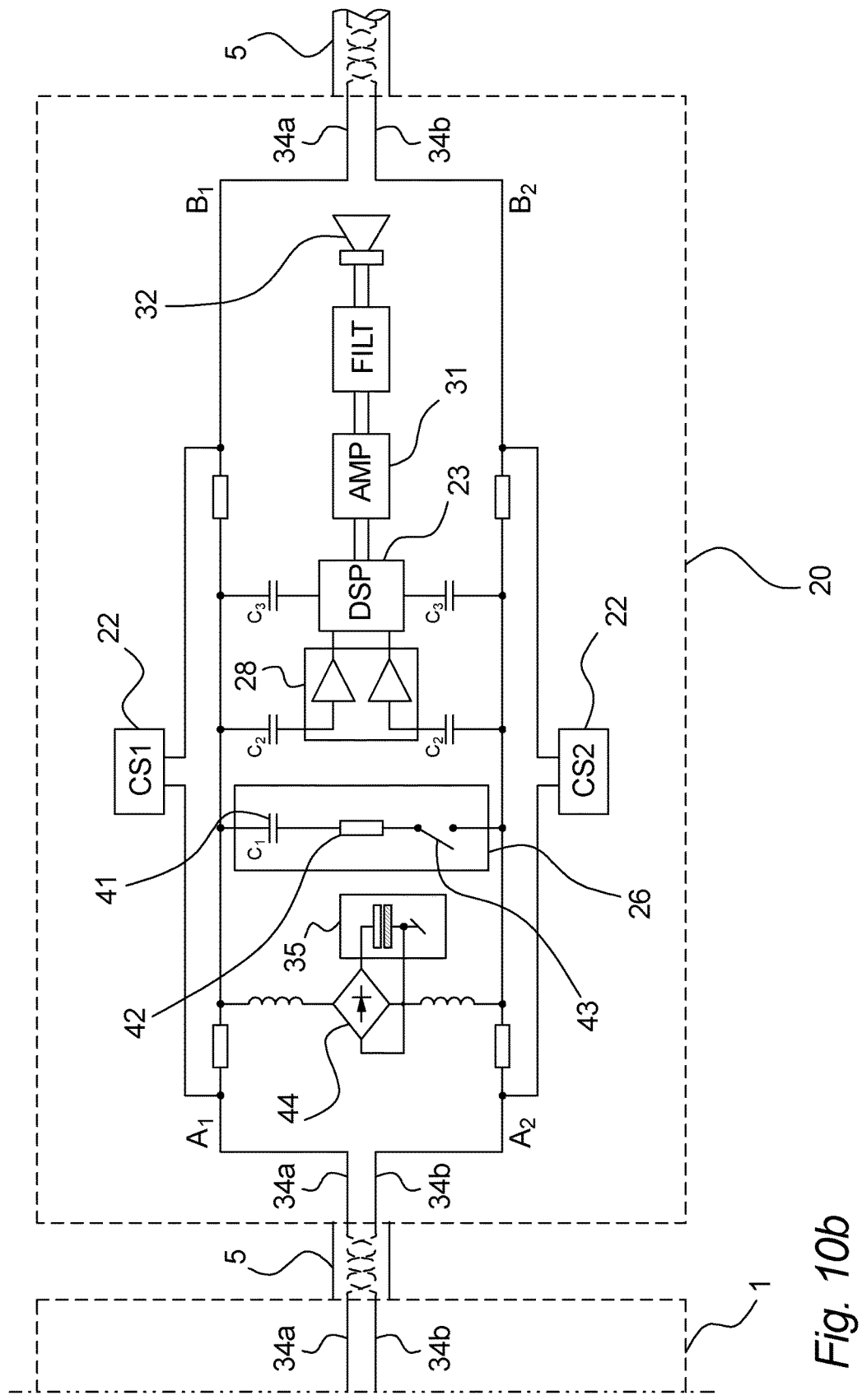
Figure 11:
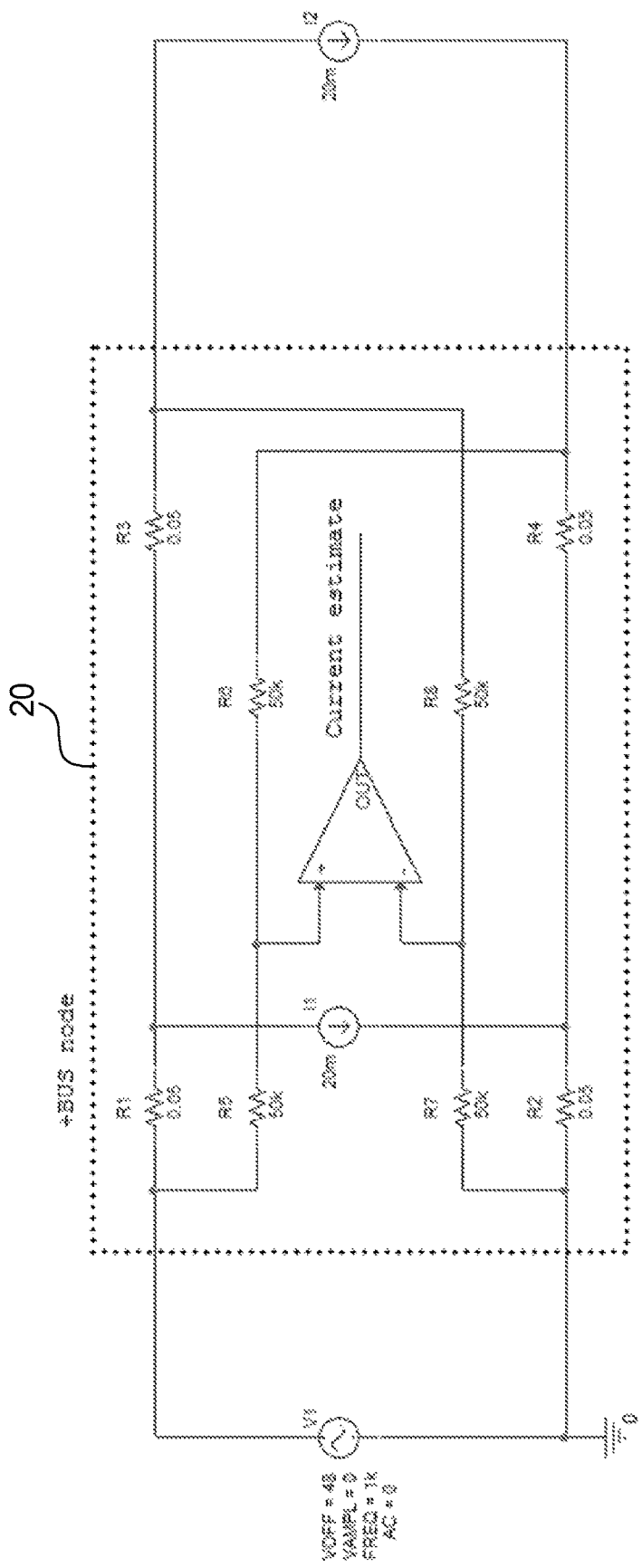
Figure 12:
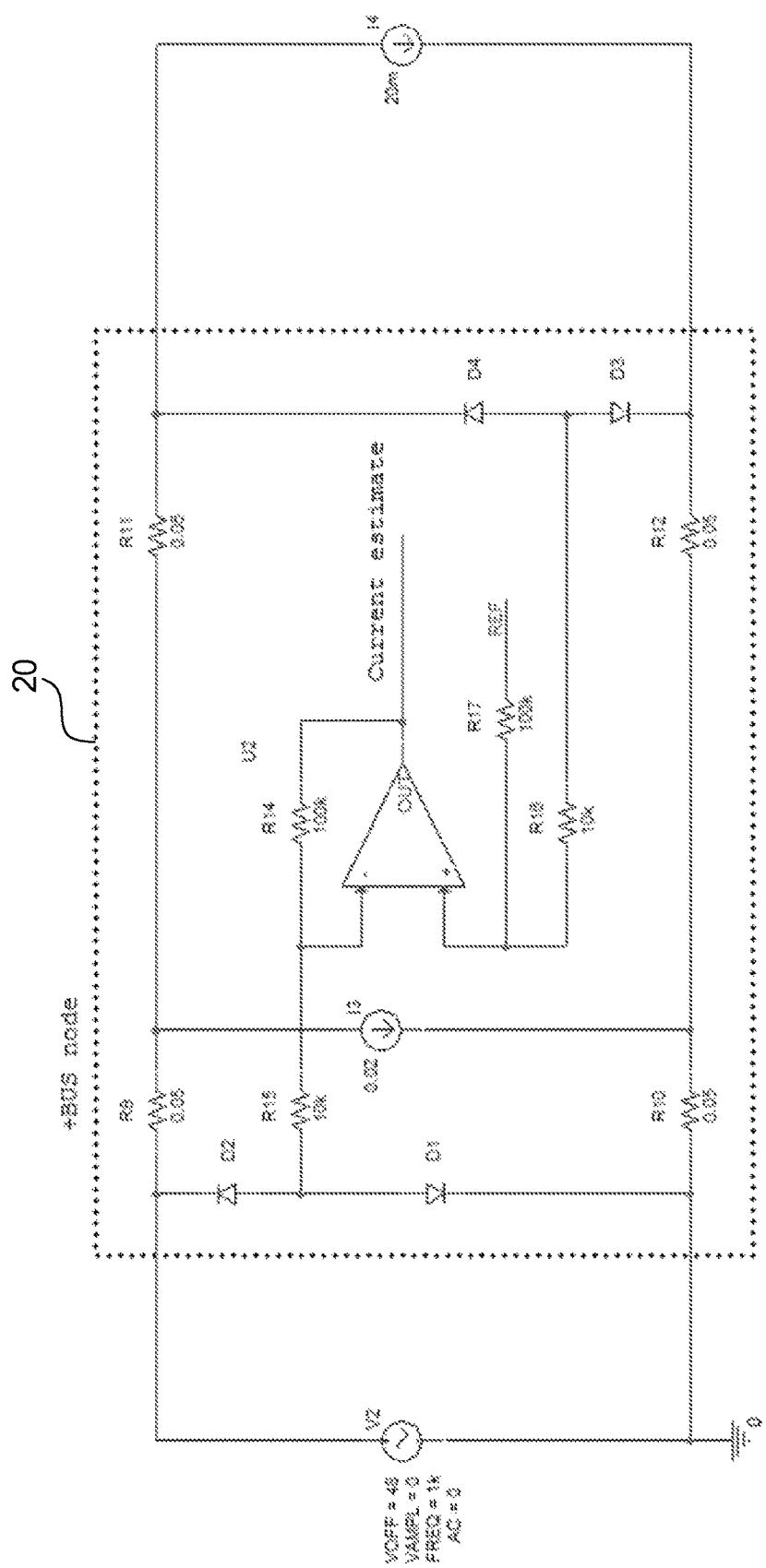
Figure 13:
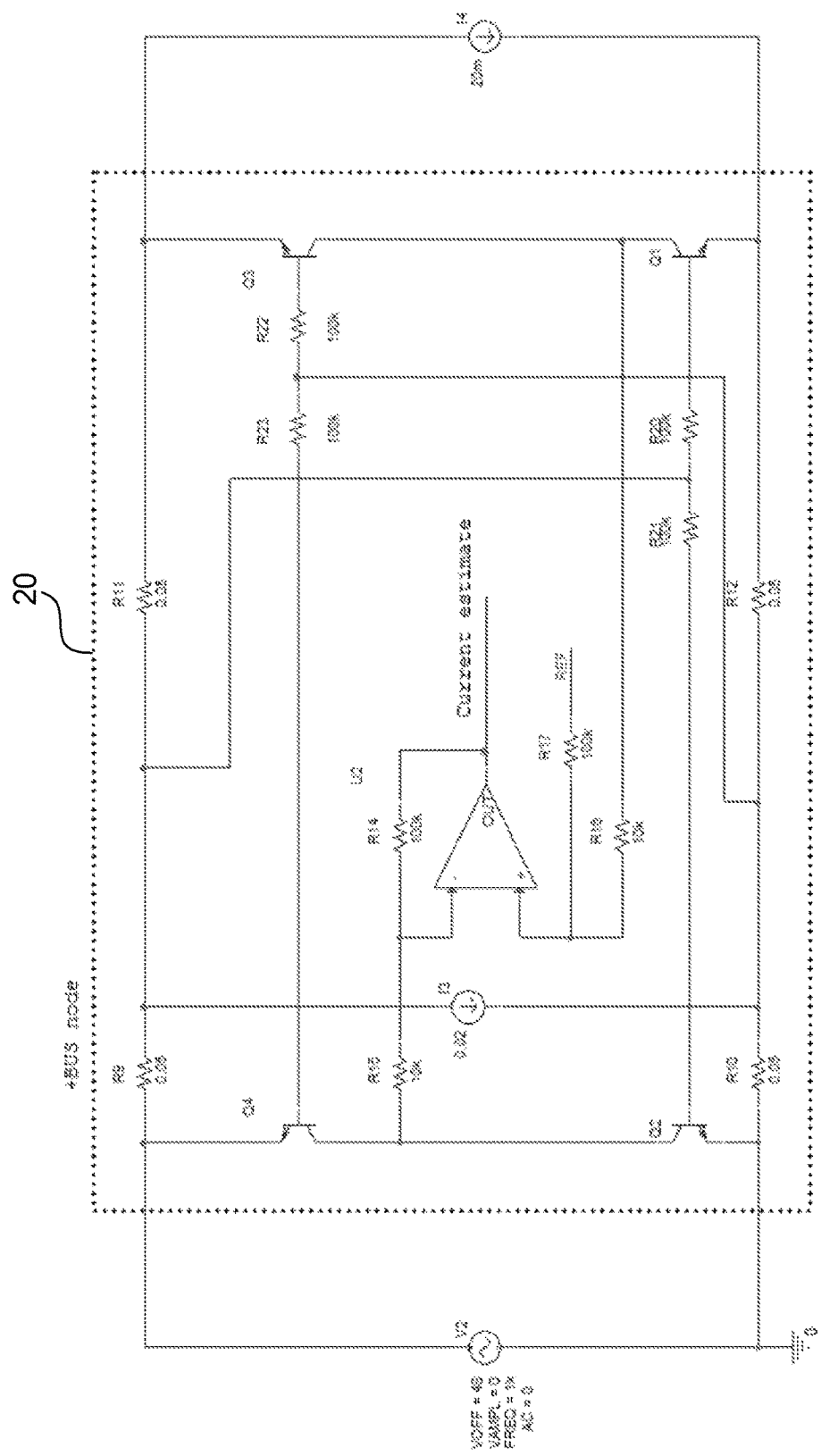
Figure 14:
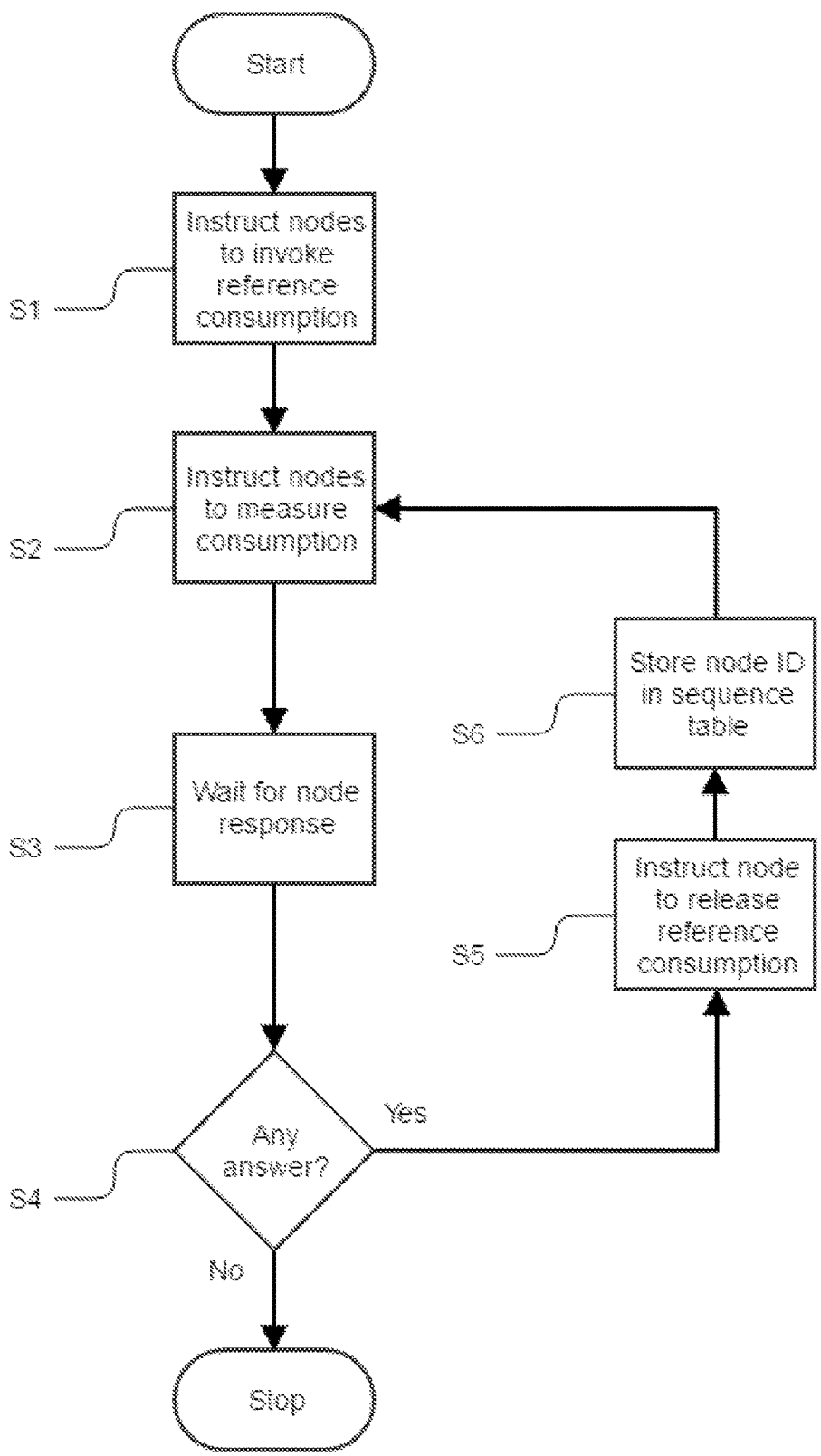

The invention will in the following be described with reference to the drawings where FIG. 1 illustrates an audio system of an embodiment of the invention, FIG. 2 illustrates a bus driver of an embodiment of the invention, FIG. 3 illustrates a node of an embodiment of the invention, FIGS. 4-6 illustrates a bus driver connected to a node in different network topologies of various embodiments of the invention, FIGS. 7 and 8 illustrate impedance balancing in an extended daisy chain network of an embodiment of the invention, FIG. 9 illustrates different audio system layouts and subset of nodes of an embodiment of the invention, FIG. 10 (10a+10b) illustrates an embodiment of a bus driver and a node with current sensors of an embodiment of the invention, FIGS. 11-13 illustrate various embodiments of current sensors of embodiments of the invention, and FIG. 14 illustrates an example node enumeration method of an embodiment of the invention.

DETAILED DESCRIPTION

FIG. 1 illustrates an audio system 33 according to an embodiment of the invention. The audio system 33 comprises a powered audio bus 5. A bus driver 1 provides control data, audio and preferably power to the powered audio bus 5. A number of nodes 20 are daisy-chained to the powered audio bus. Preferably at least a number of the nodes 20 comprises loudspeakers, for example a built-in active loudspeaker, an output stage with a loudspeaker output for connecting an external passive loudspeaker, or a line-out or equivalent for connecting an external active loudspeaker.

FIG. 2 illustrates a bus driver 1 of the audio system 33 in more detail according to an embodiment of the invention. The bus driver 1 is preferably supplied with power from a driver power supply 2. This power supply may e.g. be connected to 110/230 VAC mains, or comprise a DC source or any other electrical power source. Further, the bus driver 1 preferably comprises a driver power converter 3 which converts the incoming power to a DC voltage that supplies nodes 20 of the audio system 33.

Together the driver power supply 2 and the driver power converter 3 supply all electronics of the bus driver 1 and nodes 20 with suitable working voltages and may be referred to as bus power supply. The components of the bus power supply may be implemented in the bus driver 1 or may be external to the bus driver 1 and coupled directly to the powered audio bus 5.

The DC voltage is preferably below 50V and preferably between 40V and 50V. Preferably 48V is provided to the nodes 20 via the powered audio bus 5. The DC voltage should be balanced between low losses in the powered audio bus 5 (high DC voltage limits power loss) and secure or non-hazardous data transmission (low DC voltage facilitates avoiding conduits and compliance with safety requirements). Hence communication between the bus driver 1 and the nodes 20 therefore both comprise a supply voltage powering the nodes 20 and an audio signal for broadcasting via the nodes 20.

It should be mentioned that the capacity of the power supply 2 may vary from e.g. around 50 W to over 1000 W depending on the size and requirements to the audio system 33. Further, if considered necessary, an external (to the bus driver 1) power supply also referred to as injection power supply may be connected to the powered audio bus 5. The power is used at the nodes 20 for supplying local amplifiers, data processors, etc. Power injectors for supplying additional power to the powered audio bus may preferably also be implemented as nodes and receive control data from the bus driver, for example in preferred embodiments to be shut off or disconnected during a node enumeration process to not disturb current measurements. The power injectors may for example use principles from the power over Ethernet (PoE) technology to inject power. Power injectors may provide power from mains, a battery or the like.

Preferably the bus driver 1 further comprises a first driver filter 4, which decouples the driver power supply 2 from the powered audio bus 5 (the preferably two conductors hereof denoted 34a, 34b of FIGS. 4-6) with regards to alternating current. The first driver filter 4 may be implemented using power inductors, preferably with an inductance above 10 uH for all operating currents.

Preferably the bus driver 1 further comprises a driver current sensor 6. This current sensor 6 is optional and if implemented, the current sensor 6 facilitates measurement of the current consumption on the powered audio bus 5 downstream from the bus driver 1. In addition, the driver current sensor 6 may act as a powered audio bus voltage monitor.

Preferably the bus driver 1 further comprises a driver audio interface 7, which acts as interface towards audio signal(s) between the bus driver 1 and an external audio source 8. Audio in this context may be analog (balanced or unbalanced electrical signal) or digital audio sent from the audio source 8 via WiFi, Bluetooth, Ethernet, USB, SPDIF, AES/EBU, ADAT, TOSLINK or through any other suitable digital protocol. Hence when referring to audio throughout this document a reference is made to a data signal which may comprise other information beside audio such as simple data, video, etc. to be exchanged between the bus driver 1 and the nodes 20.

Preferably the bus driver 1 further comprises a driver interface unit 9, which acts as interface towards control/information/status signal(s) between the bus driver 1 and external controller(s) 10. These signals may be sent through WiFi, Bluetooth, Ethernet, USB, RS232, RS485, or through any other suitable mechanism.

The bus driver 1 may include an internal audio source (not illustrated) or be connected to an external audio source 8 as described above. An external audio source 8 may be located as part of a LAN (LAN: Local Area Network) or the internet. It may be accessed remotely from the bus driver 1 e.g. via a wireless/wired LAN or the internet. The audio source 8 could be any audio player such as a portable device such as a tablet, smartphone, laptop etc. or it could be part of a larger setup for audio production and/or audio distribution such as a stationary media player, computer, data storage, radio, matrix unit, audio power amplifiers or the like. The audio source 8 could also be a "music player" inside the driver, like e.g. a radio receiver or a streaming media receiver, which receives digital audio from the internet.

The type of audio source 8 could be any source relevant for the application where the audio system 33 is in use and is therefore not important to the present invention. The present invention focus on the distribution of the audio signal and not on the source or type of the particular audio signal. Therefore, the driver audio interface 7 is not specified further in that different audio source 8 (if not part of the bus driver 1) could be connected to the bus driver 1 by various types of optical, wired or wireless audio and video connectors such as e.g. different types and sizes of jacks, plugs, connectors, screw/screw-less wire connections or the like, and the audio signals could be of various relevant analog or digital audio formats, encodings, compressions, container formats, etc.

The driver audio interface 7 and the driver interface unit 9 are preferably also used as interface to other audio systems, bus drivers 1, internet etc. In this way the audio broadcasted by the nodes 20 connected to the bus driver 1 can be coordinated with other bus drivers 1 of the same or other audio systems 33. It is thereby also possible to connect the audio system 33 to other systems such as home automation systems and provide information gathered from the nodes 20 or from the bus driver 1 to such system or retrieve information from such systems for use in the audio system 33.

The internet connection for the bus driver 1 also facilitates remote control and monitoring of the audio system 33 as such and of the individual elements hereof such as the nodes 20. This means that the health of a node 20 can be remotely monitored, faults can be located which facilitates faster maintenance or replacement, data from several audio systems 33 can be logged and used for statistics and future improvements, etc.

It should be mentioned that preferably, the audio source 8 is possible to reach from a not illustrated control interface. Such control interface may be used for selecting the particular audio from the audio source 8 to be broadcasted via the nodes 20, the quality, sound level, audio channel, etc. An example of a control interface could be an app installed on a mobile device such as a tablet or smartphone, or it could for example be implemented in the bus driver 1 or external audio source 8.

The fact that the audio system 33 facilitates remote or automatically enabled individual level control of the loudspeaker 32 of the nodes 20 has several advantages.

First this enables that a given sound profile in a single zone of nodes 20 can be changed dynamically without the need for mechanically adjusting e.g. a rotary switch on each individual node 20 or loudspeaker 32. This enables that a first node of a zone has a first sound level and a second node has another higher or lower sound level, hence, the sound level of the node at the bar or the restaurant is higher than the sound level of the node at the toilet, even though the nodes are of the same zone playing the same music. This will be an advantage in zones where playback level requirements change over a daily rhythm, like in bars and restaurants. A second feature with this ability is that mix-minus can be implemented. Mix-minus is a technique where the audio level in the proximity of a person speaking in a microphone, is reduced so that the person does not hear his/her own voice at an amplified level. This feature increases the "naturalness" when using microphones. When several microphones exist within a single zone (e.g. in a conference room), it is required that the individual loudspeaker 32 can reduce its sound level as a function of which microphone is activated.

In addition, status information of the node 20 may also be measured and transmitted to the bus driver 1. Status information could e.g. be temperature, power consumption, loudspeaker impedance, etc.

Preferably the bus driver 1 further comprises a driver processing unit 11 which may be considered the main data processor of the bus driver 1 and as such of the entire audio system. The driver processing unit 11 gathers data and control/information signals and makes decisions about signal routing, nodes 20 operation etc. Hence the purpose of coordinating and controlling signals and data processing of the bus driver 1 is controlled by the driver processing unit 11. This may include defining quality of the audio signal, framing the manipulation made by the data processors, determining when and which audio signal should be transmitted from the bus driver 1, processing data received by the bus driver 1 and taking appropriate actions, calibration and setup of nodes 20, etc.

The bus driver preferably facilitates two communication channels between the bus driver 1 and the nodes 20, but may in various embodiments only facilitate one, or more than two. An advantage of facilitating two communication channels may be to ensure some degree of communication even when circumstances make one of the communication channels unusable. Therefore the two communication channels are preferably designed according to quite different technologies with different shortcomings and advantages. In an embodiment, a first communication channel may for example allow for robust communication with a simple encoding at relatively low frequencies, but inherently slow, whereas a second communication channel may for example allow for high-frequency, high-data-bandwidth advanced communication, but relatively sensitive to any irregularities.

For the above-mentioned first communication channel, the bus driver 1 may for example comprise a second driver filter 12 and a first driver analog-to-digital converter 14. The second driver filter 12 facilitates attenuation and filtering of signals and noise received via the bus 5 which does not belong to the first communication channel, and it preferably decouples the DC power of the bus from the processing of the first communication channel by means of for example capacitors.

In a preferred embodiment, the first communication channel signal passing through the second driver filter 12 from the nodes 20 is an FSK (FSK: Frequency-Shift Keying) signal with a relatively low carrier frequency, in particular preferably well below the frequency contents of the second communication channel which preferably works at frequencies far above the human audible frequency range. An example of a suitable FSK modulation scheme for this application may be a binary FSK modulation using the frequencies 8 kHz and 12 kHz, where the second driver filter 12 may be a band-pass filter allowing signal to pass in that frequency region. The typical attainable bit-rate using such a mechanism for communicating on a bus 5 is in the range of a few kbit/sec. The method for communication is mainly determined by the desired amount of the information to be sent and the bandwidth of the powered audio bus 5, hardware at the node 20/bus driver 1 facilitating data transmission (hardware here is any kind of data processor) and would in most cases be slow compared to the audio signal transmitted from the bus driver 1 to the nodes 20.

The first driver analog-to-digital converter 14 facilitates translation of the analog modulated communication signal (carrying digital data) of the first communication channel from the nodes 20 of the powered audio bus 5 to a digital (quantized in both amplitude and time) representation. In some cases, it would be advantageous to establish two-way-communication through this first communication channel 13. In case of such bilateral communication between bus driver 1 and nodes 20, the first driver analog-to-digital converter 14 may also comprise a digital-to-analog converter that translate a digital signal from the driver processing unit 11 into a time/amplitude continuous representation and pass that signal through the second driver filter 12. In the latter case a function in the digital-to-analog converter allows the digital-to-analog converter to adopt a hi-z mode when the first driver analog-to-digital converter 14 is receiving information from one or more nodes 20 on the powered audio bus 5. Preferably the driver processing unit 11 is arranged to process the, for example, FSK signal received through the first communication channel, and/or to generate, e.g., FSK signals for transmitting to the nodes 20 via the first communication channel.

For the above-mentioned second communication channel, the bus driver 1 may for example comprise a third driver filter 15 and a driver digital transmitter 17. The primary function of the third driver filter 15 is to decouple the DC power of the bus from the processing units of the second communication channel by means of for example capacitors, but it may also facilitate attenuation and filtering of signals and noise on the bus 5 which does not belong to the second communication channel.

At least the DC component from the powered audio bus 5 should be attenuated and preferably removed entirely. In a preferred embodiment, the second communication channel signal passing through third driver filter 15 may be a binary data signal holding audio related data and (optional) control data from the driver processing unit 11 to a node 20. One such binary data stream may comply with the AES3 (also known as AES/EBU) protocol having a typical rate at 44.1 kHz or 48 kHz, holding two 24 bit channels. Other rates and/or protocols may also be used, however, the AES3 protocol has proven its worth over the last couple of decades as being a very robust audio transport protocol. As a part of this standardized protocol are "user data" and "channel status" bits. For this application, these may be used as means for controlling nodes 20.

Preferably as part of the second communication channel, the bus driver 1 further comprises a driver digital transmitter 17 facilitating conversion of a digital data stream from the driver processing unit 11 to a differential electrical signal, which may be passed through the third driver filter 15 to the powered audio bus 5. In a preferred implementation, the electrical signal complies with the RS-422 or the RS-485, which are robust standardized protocols for transporting digital data over long distances and in noisy environments. These standards have been the preferred choice in many industrial automation systems for several decades. Optionally, the driver digital transmitter 17 also comprises a digital receiver (not illustrated), such that bi-directional data streaming (half duplex) can be obtained between the driver 1 and the nodes 20. When receiving data, the driver digital transmitter 17 adopts a hi-z state which is typically a built in feature in most RS-485 transceiver integrated circuits.

Such digital receiver may be connected in parallel with the driver transmitter 17 and is preferably AC coupled to the powered audio bus 5.

When the audio signal from the audio source 8 has been processed by the bus driver 1 to comply with requirements e.g. to the quality of the signal, this signal is transmitted to the network of nodes 20 via the powered audio bus 5. The choice of digital audio transport is advantageous in that it is free for disturbances like cross-talk issues and hum (50/60 Hz) artifacts and facilitates a plurality of parallel bi-directional information on the transmission conductors 34a, 34b of the powered audio bus 5 between bus driver 1 and nodes 20 such as a plurality of simultaneous audio channels along with communication of control data.

The audio/data transmission (simply referred to as audio transmission or data transmission) is preferably of a type facilitating data transmission effectively over long distances (e.g. up to a few hundred meters) and in electrically noisy environments as well as facilitating connection of multiple nodes 20 to the powered audio bus 5. Data transmission can be done in a very robust way by transmitting signals differential i.e. with information hided in the difference between two conductors.

In a preferred embodiment, the audio transmission is complying with the TIA-485 standard (formerly known as RS-485 standard), an electrical digital layer which is very robust and reliable, but other standards could also be used. Hence the digitally encoded audio information is preferably superimposed on a DC supply voltage and communicated over the powered audio bus 5. The nodes 20 then comprise an audio decoder/node processing unit 23 that reconstructs the audio signal into a format suitable for input to the node power amplifier 31 (also referred to simply as node amplifier) or directly for input to the loudspeaker 32 which then produces the final audible speech, music, tones, etc.

In an embodiment, the bus driver 1 further comprises a second driver analog-to-digital converter 18 that allows the driver processing unit 11 to read current and voltage on the powered audio bus 5. This information can be used to detect powered audio bus fail and to help in automatically establishing a map over the bus network e.g. information of nodes 20 located on the powered audio bus 5.

The bus driver 1 may be connected at least to a main power supply or battery, analog audio (balanced or unbalanced), digital audio (electrical or optical) SPDIF, TOSlink, AES/EBU, ADAT, etc., network such as Ethernet, internet, RS232, CAN, etc., WiFi, Bluetooth, etc. Further, it should be mentioned that the bus driver 1 may have a user interface with buttons, (touch) display, LEDs, etc.

Preferably the bus driver 1 further comprises a driver-bus interface 19 facilitating the connection between the bus driver 1 and the powered audio bus 5 with its nodes 20. This connection may comprise EMI (EMI: Electro-Magnetic Interference) components that reduce electromagnetic interference from/to the bus driver 1. Such components may be capacitors, resistors, inductors, transient absorbing devices, and any other parts that improve the compatibility to/from the surroundings. The driver-bus interface 19 may also comprise a physical connector, which preferably is a so-called Phoenix connector, i.e. the typical loudspeaker connector used for professional fixed installations.

As mentioned, the bus driver 1 includes one or more data processors including controller units, analog-to-digital and digital-to-analog converters, filters, transmitters and receivers, interfaces etc. Hence when the audio/data signal (simply referred to as audio signal or data signal) is an analog signal, it is converted to a digital representation of the analog signal in a desired quality. Likewise if the audio signal is a digital signal, it is converted to an analog representation hereof in a desired quality. To obtain a desired quality of the audio signal, the data processors may perform mathematical manipulation of the audio signal such as filtering, compressing/decompressing, etc. the audio signal.

According to an embodiment of the invention, the bus driver 1 facilitates both transmitting and receiving of audio/digital signals to and from the nodes 20. Hence in situations where the nodes 20 are intelligent in the sense of being able to communicate to the bus driver 1 either based on own motion or as a reply to a query from the bus driver 1, the data processors may receive and process such communication. This processing may include converting such bidirectional communication between bus driver 1 and node 20 from a digital signal to an analog signal or vice versa. Further, extraction of information sent from the nodes 20 may also be necessary and be performed by one of the above mentioned data processors.

FIG. 3 illustrates a preferred embodiment of the node 20 according to the invention. Preferably the node 20 comprises two node-bus interfaces 21 (21a first node-bus interface, 21b second node-bus interface) facilitating the connection of the node 20 to the powered audio bus 5. This connection may comprise EMI components that reduces electromagnetic interference from/to the bus driver 1. Such components may be capacitors, resistors, inductors, transient absorbing devices, and any other parts that improve the compatibility to/from the surroundings. The node-bus interfaces 21 may also comprise a physical connector, preferably a so-called Phoenix connector.

To ease the installation process and to minimize the risk of errors made during installation, the person mounting the bus driver 1 and nodes 20 to the powered audio bus 5 may freely connect either first node-bus interface 21a or second node-bus interface 21b to the upstream end of the powered audio bus 5 cable, meaning that the signal flow in the node 20 (from first to second node-bus interface) may be in either leftwards or rightwards direction. Further, the user is allowed to connect the preferably two conductors of the powered audio bus 5 cable to any of the terminals found in the node-bus interface 21a, 21b, meaning that the polarity of the part of the powered audio bus inside the node 20 (conductors between first and second node current sensor 22a, 22b) may be either positive or negative. Again, this is advantageous in that it helps to ease the installation process and to minimize errors made in that process.

Preferably the node 20 further comprises a first node current sensor 22a and a second current sensor 22b, which are arranged so that the nodes 20 own current consumption can be distinguished from any downstream current consumption—regardless of both voltage polarity and signal (preferably a DC current) direction.

It should be mentioned that the first and second current sensors 22a, 22b may further comprise means for sensing the bus voltage level. Other suitable sensor structures may be used as long as the node processing unit 23 is able to obtain at least the downstream current consumption. The current sensors 22 may be implemented using Hall sensors, inductive based sensors, current to voltage conversion using a resistor having low resistance, or any other suitable mechanism.

Ideally, the current sensors 22 does not cause any signal changes from node input to output, such that signals at the node-bus interfaces 21 are identical, meaning that they are fully transparent in both directions.

Several circuits may establish a current estimate, which is able to estimate current regardless of its polarity and current flow direction, preferably the current sensors 22 are implemented as resistors referring to zero (ground potential). Having two (identical) current sense circuits and the knowledge of bus polarity allow the slave to choose to take the current information from the current sense circuit that is connected to the ground potential. Current is preferably sensed across two resistors. This makes the node able to distinguish between its own current consumption and the downstream consumption.

Accordingly, the current sensors 22 together with e.g. the node processing unit 23 and other not mentioned components may be referred to as a bus power monitoring unit.

Preferably the node 20 further comprises a first and second node analog-to-digital converter 24a, 24b that allow the node processing unit 23 to read current and voltage on the bus, sensed as described above.

Preferably the node 20 further comprises a first node filter 25 facilitating blocking of AC currents. The purpose of the first node filter 25 is to extract DC current for powering the node 20. This first node filter 25 may be implemented using inductors having a relatively large inductance, preferably above 100 uH. This is because when looking at larger audio systems comprising several nodes 20, several of these first node filters 25 will be mounted in a parallel on the powered audio bus 5.

Preferably the node 20 further comprises a node power supply 35, also simply referred to as power converter.

The DC supply voltage from the bus driver 1 is converted at the node 20 to a voltage level of e.g. between 1V and 12V for supplying one or more data processors and other power consuming components of the node 20.

To make sure that high frequency components of the digital audio signal of the powered audio bus 5 are not "short circuited", e.g. an inductor may be implemented between the powered audio bus 5 and the components of the node 20.

Preferably the node 20 further comprises a transmission line termination unit 26, that ideally inserts an impedance if the node is at one end of the powered audio bus 5 (preferably the farthest or the last node 20 in a series of nodes 20 on the powered audio bus 5) to eliminate transmission line reflections. The node may determine itself whether it is at the end of the powered audio bus, or, preferably, the bus driver instructs the appropriate node to insert its transmission line impedance. The transmission line termination unit 26 is controlled from the node processing unit 23, which can insert a transmission line termination impedance using a relay, transistor, MOSFET or by any other suitable means. In a preferred embodiment, the transmission line termination impedance is a resistor in series with a capacitor.

It should be mentioned that the powered audio bus 5 should be terminated in both ends. At the bus driver 1 end of the powered audio bus 5, the output impedance is known e.g. from the driver digital transmitter 17.

Preferably the node 20 further comprises a second node filter 27 that attenuates signals components not of interest for passing the digital audio and control streaming data. At least the DC component is attenuated or preferably entirely removed. Such AC coupling may be implemented using capacitors and resistors.

Preferably the node 20 further comprises a node receiver, preferably a node digital receiver 28 that receives the digital audio signal (preferably via the second communication channel 16) outputted from the controller digital transmitter 17 of the bus driver 1, and passes this signal on to the node processing unit 23. The node digital receiver 28 may also (optionally) include a digital transmitter and may be implemented using a RS-485 receiver/transceiver.

Preferably the node 20 further comprises a third node filter 29 for the first communication channel that attenuates signals components not of interest for passing the control/information/status data. In a preferred embodiment, the data is encoded using frequency shift keying FSK at a carrier frequency that do not disturb the digital streaming data sent through the second communication channel 16—as described above. The third node filter 29 may be implemented inductors, capacitors and resistors.

Preferably the node 20 further comprises a node transmitter 30 facilitating outputting a modulated version of the status data sent from the node processing unit 23 to the bus driver 1. In a preferred embodiment, this may be done by using frequency shift keying FSK, in that FSK may be robust even though the farthest node 20 is not terminated yet. In this way the node 20 can be identified e.g. by means of an identifier send from the node 20 to the bus driver 1. The node transmitter 30 may be implemented by using simple buffers from the 74HC logic family (outputting squarewave signals) or by using a digital-to-analog converter. Output of the node transmitter 30 is ideally tri-stated when not sending data. Optionally the node transmitter 30 may be implemented in a bidirectional fashion, similar to the first controller analog-to-digital converter 14 of the bus driver 1.

Preferably the node 20 further comprises a node processing unit 23 acting as the main data processor of a given node 20. It receives (from the node digital receiver 28 or from any other audio sources, not illustrated), process, and outputs audio signal to a node amplifier 31 or any other audio output channels (not illustrated). Further, the node processing unit 23 receives control signals at least from either the node digital receiver 28 and/or from the node transmitter 30. These control signals are interpreted and suitable actions are carried out on basis of the control requests. The node processing unit 23 is also an important part of the "end-of-cable" identification process and the node enumeration process of the illustrated embodiment.

Preferably the node 20 further comprises a node power amplifier 31 that drives one or more loudspeakers 32. The node power amplifier 31 preferably receives audio from the node processing unit 23 (or from other sources) and may receive audio signals using an either analog and/or digital interface (not illustrated).

The node power amplifier 31 may both be of an analog (time-continuous) or a digital (time discrete) type having either an analog input signal or a digital input signal.

According to a preferred embodiment of the invention, the preferred node power amplifier 31 is a class-D amplifier. Due to the fact that the audio signal from the driver processing unit 11 preferably is a digital audio signal, the node power amplifier 31 is preferably a class D amplifier having a digital input, thus requiring no digital-to-analog converter.

With the distributed amplification at each individual node 20, where each loudspeaker has its own node power amplifier 31, the sound quality can be improved compared to the traditional 70VRMS/100VRMS systems. In the traditional systems, the audio power signal has to pass through an inherent transformer found as a part of the loudspeaker node 20. Such transformer causes core saturation effects for low frequency signals, meaning that a filter is always invoked that attenuates these signal components and thus attenuates the low end of the frequency spectrum. Getting rid of the transformer thus enhances the sound quality with a better and more "tight" bass reproduction.

Preferably the node 20 further comprises a loudspeaker 32 that comprises one or more passive loudspeakers. In a preferred embodiment of the invention, the loudspeaker(s) is (are) of the electrodynamic type, having an impedance in the range of 2-32 Ohm.

The node power amplifier 31 and loudspeaker 32 may form part of a utility unit 36 of the node 20. The utility unit 36 may also comprise a data processor, the purpose of which may be to convert and transmit data received from a transducer such as the loudspeaker 32 (making the speaker 32 act as microphone) or other not illustrated transducers such as microphones, light sensors, smoke sensors, temperature sensors, proximity sensors or the like, or emitters or actuators, e.g. LEDs, displays, etc., or interface devices, e.g. buttons, Bluetooth transceiver, IR transceiver, connectors for wired external devices, etc. Example of use of such transducers could be a microphone, preferably connected to node processing unit 23, e.g. via an A/D-converter, which may be employed for any of the following or other uses: estimate ambient noise level or speech (e.g. to determine human presence), auto calibration, test of loudspeaker, determine location of other loudspeakers, sound level triggered burglar alarm, etc.

Such transducers could be standalone or integrated into the node 20/bus driver 1, separate monitoring nodes connected to the powered audio bus 5, connected separately to the bus driver 1, etc. Such recorded information is transmitted (if necessary, after conversion from digital to analog or vice versa) by a suitable data processor to the bus driver 1 via the powered audio bus 5. Alternatively or in addition hereto, such information may be stored in a local memory (not illustrated).

As mentioned, the nodes 20 are preferably supplied with a DC voltage from the bus driver 1 via the powered audio bus 5 which preferably comprises at least two separate conductors 34a, 34b.

The size in terms of power consumption of a node 20 is mainly determined by the size of the loudspeaker 32 and examples of power consumption of the nodes 20 could be between 2 W and 400 W or higher, if needed, depending on purpose of use of the audio system 33, when operating at maximum power capability.

The fact that the nodes 20 comprise built-in data processing makes the nodes 20 intelligent thereby facilitating the creation of physical smaller nodes 20 with individual (possible remote) level control, audio source selection, etc.

As mentioned, these data processors facilitates, according to a preferred embodiment of the invention, digital signal processing, class-D modulation and facilitates receiving the digital signal transmitted via the standard or proprietary protocol as described above. In addition to the above described operations, these data processors may also facilitate operations from the following non-limiting list of operations which includes: equalizing, artificial reverberation, linear filtering, compensating the loudspeaker, limiting, compensating dynamic drop of DC voltage on the powered audio bus, registering and translation of sensor signals, frequency shift keying modulation, Class-D modulation to drive the loudspeaker, bass enhancement, speak and/or music discriminator which control equalizing speak and thereby making the speak easier to understand and/or making music sound better, etc.

It should be mentioned that some of these operations may also be facilitated by the data processors of the bus driver 1.

It should be mentioned that according to an embodiment of the invention, the bus driver 1 may at least partly be implemented as part of a node 20. Hence in this way, one single node 20 may comprise the bus driver 1 and thereby no standalone bus driver 1 may be necessary.

The illustrated bus driver 1 and nodes 20 are built from different components and it should be mentioned that the components and bus driver 1 and node 20 as such mentioned in relation to FIGS. 1-3 may be combined in any suitable way to facilitate the desired audio system 33. Further, not mentioned components may also be needed such as a driver memory or node memory for storage of information retrieved during operation of the audio system 33 or preloaded with information relevant to operation of the audio system 33. Such memories could be of a minimum capacity such as a simple ROM only comprising an identifier such as a serial number of the node. However in most situations, the memories may be of a size capable of storing more data such as megabyte or gigabyte and of a type facilitating both reading from and writing to.

Further it should be mentioned that the fact that several data processors are mentioned should not be understood literally in that these may alternatively be implemented as one or more multifunctional data processors/units.

The audio system 33 of the present invention facilitates an intelligent audio signal distribution from bus driver 1 to individual nodes 20 and from nodes 20 to the bus driver 1 as will be described below.

FIG. 4 illustrates an audio system 33 according to an embodiment of the invention comprising an audio source 8 connected to or part of a gateway also referred to as bus driver 1, transport media referred to as powered audio bus 5 or transmission line and a plurality of nodes 20. The powered audio bus 5 preferably comprises a first and a second conductor 34a, 34b.

To distribute power from an energy source internal or external to the bus driver 1 (audio power amplifier or power supply) to a passive or active node 20, the preferred choice for implementing the powered audio bus 5 is copper cables, since copper offers the best conductance. Aluminum cables could also be attractive, even though its resistivity is higher, as the total cost of cabling currently would be less than cobber cables and thereby it currently provides a better conductivity to weight ratio than copper. However, aluminum has a drawback when it comes to standard terminals, like common screw terminals, because metal oxidation will begin to act as an electrical insulator in a thin aluminum oxide layer. Further, the screw terminal requires a larger size to fit the larger wire dimension required to offer similar resistance as copper.

In relation to the distribution of an audio signal in either analog or digital form at least three options exist namely wireless using radio wave technology like WiFi, Bluetooth, ANR, ZigBee etc., optically using glass or plastic light-guides or electrically using conductive wires.

The wireless technology is at present not considered an option by professional audio integrators and consultants in that it is not considered robust enough. However for audio systems 33 with low requirements to robustness, wireless technology is an option as it most likely will be in the future for audio systems 33 having higher requirements to robustness as the wireless technology develops further. Another argument for not selecting wireless technology as the preferred technology is that wireless systems would require receiver/transmitter at the nodes which then would increase power consumption and thereby price of the audio system 33. Again, on the other hand, the benefits of the wireless system may compensate for these drawbacks in certain audio systems 33.

The optical data transfer technology has advantageous properties. First of all, the data bandwidth capabilities of an optical link are excellent. Optical fibers offer an extremely high data-rate for a given size of fiber and the signal quality loss, as a function of cable length, is low compared to electrical conductors. The downside however of optical fibers is the termination of the cable. When it has to be connected to a given device, the cable has to be cut and connected to the device through an optical receiver that translates light to an electrical signal. The cutting and mounting process is complicated, compared to a simple RJ45 plug or screw terminal connector.

Electrical conductors are preferred for use as transmission conductors 34a, 34b for carrying the audio signal from the bus driver 1 to the nodes 20 and vice versa and both in relation to analog and digital audio signal transport, a distinction between single-ended or balanced signaling can be made.

In a single-ended approach, the electrical information is placed relative to a common ground potential. This approach is primarily used for short distances and is simple and requires only a single transmitter and a single receiver for a single channel audio stream (analog or digital). However, the topology has one main drawback which is a lack of common-mode rejection.

To overcome the flaws of the single-ended communication topology, balanced signaling is preferred. This technique uses two conductors per information stream. The basic idea is to send out the information as a differential signal that holds the information as a difference between the electrical voltages on two conductors. Typically, this requires two (identical) individual transmitters that output the utility signal with opposite phase. In the receiver end, the difference is found using a differential amplifier that have a high Common Mode Rejection Ratio, meaning that any signal component common for the two conductors are canceled out. This means (in contrast to the single-ended topology) that even though common voltage potentials on the transmitter device and sender devices bounce up and down, this is not causing any false differential signal seen by the receiver.

Beside the advantage in relation to rejection of common-mode when using balanced signaling, the conductor pair, especially when the two conductors are twisted, also has much better properties regarding potential interference from and to other electrical conductors. Such interference could e.g. origin from electromagnetic disturbances from external sources (other cables in cable trays etc.).

Therefore the powered audio bus 5 according to a preferred embodiment of the invention is one type of standard commercial audio cable with insulated twisted pair cobber conductors such as the "Belden 5300U" type of security and commercial audio cable. With this said other types of cables could also be used such as shield or unshielded multi-conductor Cat5 cables or other cables, shielded or unshielded twisted pair type.

Key feature in deciding type of cable is that the cable is capable of transmitting digital signals at a high bitrate and that it complies with EMC requirements. In addition, it is preferred if existing cable e.g. used in existing 70V/100V analog audio systems could be used. Surprisingly the "Belden 5300U" (and similar) type cable facilitates transmission of digital signal at high bitrate and because the conductors are twisted, the cable are complying with EMC requirements and are commonly used in existing 70V/100V systems.

In principle, using a two conductor shielded cable gives three conductors which may be needed in some embodiments.

It should be mentioned that according to a preferred embodiment of the invention, the powered audio bus 5 is connecting a plurality of nodes 20 to the bus driver 1, preferably in a daisy chain network. Though it could be indicated from the figures of the daisy chain structure that the nodes 20 are series connected, the nodes 20 are substantially parallel connected from an electric point of view.

As mentioned the nodes 20 of the audio system 33 are preferably connected in a daisy chain network by a two conductor type transmission media also referred to as powered audio bus 5. It is preferred that the powered audio bus comprise two conductors 34a, 34b mounted directly in loop terminals also referred to as node-bus interface 21 of the nodes 20 which is illustrated on FIG. 4. As illustrated on FIG. 4, one end of each of the first and second connectors 34a, 34b is connected to a driver-bus interface 19 of the bus driver 1 and the opposite end of the first and second connectors 34a, 34b is connected to the node-bus interface 21 of the node 20a. The node-bus interface 21 of the node 20b is chained via the first and second conductors 34a, 34b to the node-bus interface 21 of the node 20a and so on.

As mentioned above, the nodes 20 are developed in such way that installation i.e. mounting of the transmission conductors 34a, 34b cannot lead to failure nor by confusing the mounting of the conductors 34a, 34b, neither to a particular terminal nor by confusing which of the node-bus interfaces 21a, 21b these conductors 34a, 34b should be mounted at. Thereby it is ensured that the audio is always in phase in that polarity of the conductors can be ignored and mounting of nodes 20 in the audio system 33 therefore becomes very easy and can be done without special knowledge to audio systems in general.

Preferably the conductors 34a, 34b of the powered audio bus 5 are connected directly to the nodes 20. Thereby additional conductors from the node 20 to the powered audio bus 5 e.g. a junction box connecting the additional conductors to the powered audio bus 5 is avoided which is an advantage in that such additional conductors could make communication of information from node 20 to bus driver 1 difficult. An example of such communication could be automatic individual node identification (e.g. node identification is sent to the bus driver 1 e.g. upon a request from the bus driver 1) or location of a node 20 in the network.

An advantage of daisy chained nodes 20 connected as described in this document is, according to the invention, that multiple audio channels can exist within a single transmission line (either as multiple conductors or as multiple digital audio channels within a single conductor pair), thereby making the audio system 33 and the installation as such more flexible. Since a single cable (powered audio bus 5) can carry the audio signal for more than one single subset of nodes 20 or zone of nodes 20, the cabling layout can be simplified and thus labor cost can be reduced. In fact, existing audio systems having a transmission line comprising at least one conductor pair can be retrofitted or updated to an audio system of the present invention.

One single daisy chain of nodes 20 would potentially supply several different loudspeaker zones with individual audio channels as illustrated on FIG. 9 which illustrates a planar view of an audio system 33 according to the invention.

The audio system 33 of the present invention is very flexible in terms of number of audio channels, number of nodes 20 in a zone and in the daisy chain network and size or length of the powered audio bus 5 from the bus driver 1 to the last/farthest node 20 in the network.

The size of such daisy chain network could be determined by the number of audio channels and the quality of audio on these channels. According to an embodiment of the invention, a daisy chain network with two 48 kHz audio channels would work fine even at a length of 100 meter of the powered audio bus 5 with sixteen 16 nodes 20 connected hereto.

With regard to the number of nodes 20 of the daisy chain, the limiting factor here is the degradation of transmission line quality and introduction of reflections each time a node 20 is added which introduces the risk of bit-errors.

Each parameter (nodes, quality, length, channels) are mutually influencing each other hence if e.g. only one channel is needed, the length/size of the daisy chain network can be increased. Another example could be if quality is required at 48 kHz/24 bit, then bandwidth may only allow two channels whereas the same bandwidth (48000*24*2=2.304 Mbit/sec) could be used to stream four 36 kHz/16 bit channels.

In general, it should be mentioned that it is preferred that the control of the nodes 20 i.e. distribution and broadcasting/producing of audio has higher priority than monitoring i.e. nodes 20 return information of the node 20 and its surroundings to the bus driver 1. The latter upstream status information may be sent at a few kbit/s, which enables that simple status information of a few bytes can be received from multiple nodes within a second by the bus driver 1.

In addition to the downstream audio stream and the upstream status, the downstream control signals i.e. queries, requests, status or user bits, etc. from the bus driver 1 to nodes 20 is also transmitted on the powered audio bus 5 e.g. at a speed of for example 96 kbit per second.

The audio system 33 preferably facilitates automated initialization i.e. upon request from the bus driver 1 each node 20 replies e.g. with type, serial number, etc.

As mentioned, the bi-directional data streaming enables end-node 20 monitoring. This enables a remote service functionality, where the entire audio system 33 including the nodes 20 and their loudspeakers 32 can be checked and precise error information is at hand before a service technician is at the location. This feature is also advantageous in the installation phase of the audio system 33, especially during installation of the daisy chain to verify the installation without the need for manually checking each individual node 20. When the bus driver 1 is connected to the internet, the remote services can be used from anywhere with connection to the internet.

The network layout illustrated on FIGS. 4-6 is preferable a daisy chain topology, which resembles a coupling where the network bus driver 1 and network nodes 20 all sit electrically coupled in parallel or substantially in parallel. The node-bus interfaces 21a, 21b of the nodes 20 are virtually a short circuit, only having resistive loss from connectors and current sensors 22. Network examples can thus be illustrated as shown in FIGS. 4-6 (connectors and current sensors not illustrated).

To minimize reflections in the cable constituting the powered audio bus 5, it is important to ensure that source impedance (bus driver output impedance), cable impedance and termination impedance (termination impedance is attached between bus conductors 34a, 34b in the last/farthest node 20 in a given branch or daisy chain) are identical or substantially identical. In a preferred embodiment of the invention, these three impedances (seen from a differential perspective in the range from 100 kHz to 10 MHz) are all in the range of 40 to 120 Ohm.

The network topology, however, is not bound to the pure daisy chain. Using Y-splitters 39 as illustrated in FIG. 5, the powered audio bus 5 may be divided into two (or even more) branches. To keep the impedance matching intact, it is important to insert a termination impedance in the end of both branches. It is furthermore required to add impedance matching means in the Y-splitters 39.

FIG. 6 illustrates an example of a ring topology powered audio bus according to an embodiment of the invention. A powered audio bus 5 with several daisy-chained nodes 20 as described above are connected at each end to two individual audio bus ports of a bus driver 1. The bus driver is configured to handle the two ports as one powered audio bus of a ring topology, or detects this situation itself, e.g. by being able to receive its own control data of one port at the other port. Preferably, the bus driver makes one of the ports inactive, and may in various embodiments apply a transmission line impedance at the inactive port, or rely on the node nearest to the inactive port to be detected as farthest node and be instructed to apply its transmission line impedance as described above. An advantage of ring-topology embodiments is that in the case of cable break, disconnection of a node or other events that amputates a part of the powered audio bus from the bus driver, this situation may be detected by manual alarm input, by detecting impedance mismatch, low-quality communication, or by other automatic means, and upon concluding that a part of the bus is unreachable, the bus driver may activate the second port, perform node enumeration procedures on both ports, and thus proceed operation with two individual, powered audio buses. In other words, the ring topology enables a redundancy which is highly advantageous for critical audio systems, e.g. emergency or evacuation systems. The ring topology may also be implemented by various other embodiments, for example by providing an individual bus driver at each end of a powered audio bus, and either manually or automatically coordinate between the two bus drivers which one is active during normal operation, thereby still allowing the other bus driver to take over part of the powered audio bus in case of disruption. Thereby the bus driver function is also made redundant, and may advantageously be located in different physical locations to preserve one driver even in case of local fire, power loss, etc. A variation of the ring-topology embodiment comprises two or more bus drivers being connected to the powered audio bus at different locations, e.g. four bus drivers being distributed along the powered audio bus, and mutually coordinating or being coordinated which one operates as active bus driver during normal operation. In case of bus failure, a re-coordination takes place to determine the most appropriate bus drivers to take over operation of any amputated parts of the bus, and each active bus driver performs a re-enumeration of connected nodes.

Various other topology embodiments, including for example combinations of the topologies described and shown with reference to FIGS. 4-6 are possible and suitable for different applications, building layouts, purposes, safety regulations, etc.

Impedance matching in a Y-splitter 39, as for example suitable for a branched powered audio bus as shown FIG. 5, can be established using three identical impedances, also called a "hairball network" as illustrated in FIG. 7 (single ended for the sake of simplicity). Seen for any end of this star configuration, the impedances Z1, Z2 and Z3 equals R/3+(R/3+R)/2=R, which ensures that reflection related problems are minimized. However, the network introduces an attenuation of 6 dB from one branch end to another.

For a 2-line DC powered bus, the pure resistor based approach is not suitable, since the relatively small resistors will introduce a significant power loss when drawing current through the bus. To circumvent that problem, the impedance matching means may be designed so that impedance matching resistors only "exist" for AC, leaving out DC. One solution is illustrated in FIG. 8, where resistors are DC decoupled using capacitors and the DC power distribution is handled through the inductors L.

FIG. 9 illustrates a layout of the audio system 33 according to an embodiment of the invention. A first bus driver 1*a* controls nodes 20*a*-20*d* on a first powered audio bus 5*a* and a second bus driver 1*b* controls nodes 20*e*-20*h* on a second powered audio bus 5*b*.

The nodes 20*a*-20*h* may be located in one or more environments. An environment may for example be defined by a room. A zone including a subset of nodes 20 may be defined more or less related to environments and bus, and provides an abstraction level for assigning any loudspeaker to zones regardless of their environment and bus topology. Typically, assignment to zones is used to broadcast the same audio or controls to the nodes of a common zone. It should be mentioned that the grouping of subsets of nodes 20 in zones or environment may include nodes 20 controlled by different bus drivers 1. Hence a zone or subset of nodes 20 should be understood as one or more nodes 20 grouped and thereby playing the same audio signal.

FIG. 9 illustrates two daisy chains of nodes 20*a*-20*d* and 20*e*-20*h* distributed over two environments, rooms 37 and 38. The first room 37 may be divided in two zones 37*a* and 37*b* e.g. based on use of the room 37, hence zone 37*a* may be a busy and noisy area and zone 37*b* is a relaxing area of room 37. Room 38 represents only one zone denoted 38*a*.

Now if different audio signals are to be broadcasted in environments 37 and 38, the nodes 20*a*-20*h* have to be divided in zones. Hence zone 1 comprising node 20*a*-20*c* and 20*h*, zone 2 comprising nodes 20*d* and 20*e* and zone 3 comprising nodes 20*f* and 20*g*.

The subset of nodes representing zones 1-3 is either automatically or manually configured to the respective zones facilitating the playing of different audio or the same audio at different sound levels. Playing an audio signal should be understood as converting an audio signal to speech, music, tones, etc. audible at least to humans.

In an embodiment, the nodes may be pre-configured during installation, for example with regard to zone assignment, audio channel selection, audio level, or other basic configuration parameters. The pre-configuration of a node may for example be facilitated by the nodes comprising a hardware selector and/or a programmable memory, which the installer may use to set one or more parameters, and which may be read by internal circuitry after power-on. For example, a rotary encoder, a DIP-switch (DIP: dual inline package), an NFC-receiver (NFC: near field communication), an RFID-tag (RFID: radio frequency identification), etc., may be provided at the node. During installation, there is access to the pre-configuration selector at the node, and the installer may pre-configure for example which zone the node initially belongs to, and an initial attenuation level. The pre-configuration may even be applied before the node is connected to the powered audio bus, and thereby before it receives any power. The settings may be part of an installation project plan or be decided spontaneously by the installer. However, as such pre-configuration is prone to human error and/or change of mind after closing off the installation, ceiling, wall, etc., an embodiment comprising a verification of the pre-configuration is therefore very advantageous, as is a preferred embodiment allowing the bus driver to overrule the pre-configuration of a node.

To facilitate the automatic configuration of zones, the bus drivers 1*a* and 1*b* may be connected either directly or via an external audio source 8 or external controller 10.

Accordingly an aggregated environment comprises a set of environments 37, 38 each comprising one or more of the loudspeakers (also referred to as nodes) of the loudspeaker system. Each environment comprises a physical area e.g. a hallway, a conference room, a restaurant or a similar physically delimited environment. In other words, the environments are defined by physical structures serving as acoustical and/or visual obstacles such as walls, floors and ceilings, doors and windows, partitions, plants, curtains, or even relatively large distances of space. The aggregated environment may thereby for example be an office building, restaurant building, etc., comprising a set of environments. The aggregated environment is limited to the aggregation of environments comprising loudspeakers of the loudspeaker system, and may thus be limited to a part of a building, floor, etc., and comprise a single environment or several environments. The loudspeaker system may comprise loudspeakers installed in one or more environments.

The topology of the loudspeaker system (also referred to as daisy chained nodes or audio system) in terms of electrical or communicative connections may often be quite unrelated to the topology of the environments.

In an embodiment, sound measurements may be analyzed for information about acoustic obstacles obtained by analyzing when certain microphones do not hear or only vaguely hear the sound from certain loudspeakers, thereby enabling a grouping of the loudspeakers in different of said environments, as well as information about reflective surfaces enabling estimating distances between loudspeakers and surfaces, thereby making it possible in certain embodiments to estimate the dimensions in two or three dimensions of the environments, e.g. the dimensions and shape of a room. In an embodiment, visual information e.g. from a camera, information about physical properties from distance measurements, e.g. by laser or accelerometer, positioning systems or blue prints or other formal data or manually inserted data, etc., may be analyzed to estimate the dimensions of environments and relative or absolute positions of the loudspeakers. In an advantageous embodiment, automatically or manually determined information about environments may be used to make a basic suggestion or basic starting configuration for how the loudspeakers could be divided into loudspeaker zones for the subsequent normal operation. In many practical applications, the basic starting configuration established this way will be perfectly suited for most uses.

The topology of the environments may not necessarily correspond to the topology of the loudspeaker zones. In other words, network-topology, loudspeaker connections, environments and loudspeaker zones are non-constrained, but at least partly overlapping.

In an advanced embodiment, the assigned loudspeaker zones may not be static or permanent, but may be changed according to the application of the room or hall. Applications such as "live concert", "conference", or "lounge bar" may require the loudspeakers to fulfill different roles.

As can be seen from the above description, the inventive audio system 33 has several advantages of which the feature of power and bidirectional data transmitted over a two wired powered audio bus 5 between the bus driver 1 and the nodes 20 and the polarity-indifference of the two wires 34a, 34b are especially advantageous.

Of these advantages could at least be mentioned individual fault monitoring of loudspeaker 32, individual gain, delay and equalizing with high granularity, dynamic paging and grouping of nodes 20, multiple node types on the same daisy chain, more than one zone or channel on the same daisy chain, possibility of retrofitting or updating existing audio systems without need of installing new transmission line between nodes of the existing system, equal audio quality in first and last node 20 of the network, facilitates automatically debugging locating at which node an error may be present and use of thinner conductors 34 compared to traditional comparable audio systems.

The reason for being able to use thinner conductors 34 at the present audio system 33 compared to e.g. 70VRMS is that at 70VRMS, the RMS of the audio signal is significantly lower than at the 40V-50V DC system suggested by the present invention. Hence the currents and thereby losses of the present audio system 33 are reduced significantly as compared to a 70VRMS system.

Compared to the traditional 70/100V installation technology, at least the following advantages exist:

Cabling may be phase indifferent. Swapped conductors in the cable will not cause 180 degree phase change for the resulting acoustical output.

More than one audio channel may be transported on a single cable (twisted pair) simultaneously. This means that multiple zones can be covered using a single daisy chain (cable).

The system may incorporate a node enumeration process that establishes a list holding all bus nodes including the physical (electrical connection) sequence from first to last node on the bus. This list ensures that all electrical connections are functioning. Deviations from the list obtained during last power-up, may be reported (automatically via email or similar) to a given location.

The system may incorporate a self-test feature, which tells the installer/maintenance personnel where the last functional node on the cable is located.

Each node may implement individual level control, EQ and other DSP related functions which can be remotely controlled. This is an advantage when the system is installed in an environment where it would be advantageous to shift "sound profile" as function of the environment, e.g. in a restaurant, where it would be desirable to adjust sound level in only a sub-section of the total restaurant space for some occasions—or even differentiated audio material (corresponding to dynamic/virtual routing capability).

The status of each individual node can be monitored, meaning that loudspeaker (and amplifier) status (temperature, power consumption, impedance) can be continuously followed.

The sonic quality may be improved, due to the absence of the audio power transformer, which typically requires that the audio signal is high-pass filtered to avoid distortion for low frequencies. Driving the loudspeaker directly without this transformer will enable a richer and more tight bass reproduction.

The power loss in the cabling will be lower compared to a 70/100V system when reproducing audio material. For typical audio signals, the crest factor is 12 dB. This means that the RMS voltage for full scale audio in a 70V (100V peak) system is only 25V, compared to the proposed system, maybe having 48 VDC (=48 Vrms) on the bus. This difference will cause a current in the 70V system, that are roughly twice the current in the 48V system, turning into four times higher cable power loss ($P=I^2 \cdot R$), assuming similar cable thickness (resistive conduction loss). This fact may be utilized into either (1) using thinner cables, or (2) offer increased cable length for a given cable dimension (and acceptable loss).

The system may further comprise several other types of sensors not directly related to the audio reproduction. Examples may be light sensors, smoke sensors, gas sensors (CO), proximity sensors or any other kind of sensor. Information from these sensors may be relayed back to the bus driver 1 and further onto the internet and/or other equipment connected to the driver and/or bus.

The bus peak voltage is lower compared to 70V (100V peak) or 100V (140V peak). Using 48V means that the system may be mounted by "anybody", since 48V is considered non-hazardous, whereas the installation of 70/100V systems may require certified personnel.

The description of the figures has focused on the elements providing a feature to the invention. Therefore it should be mentioned that other not mentioned elements may also be implemented in various embodiments. Such elements could be capacitors mounted between the transmission conductors 34 of the powered audio bus 5 and the driver processing unit 11, the data transmitter and receiver of the bus driver 1 and the transmission conductors 34 of the powered audio bus 5 which is used as a filter for preventing the DC power signals from interfering with the processing of the data.

In the same way, an inductor may be present between the power supply 3 of the bus driver 1, the power supply 35 of the node 20 and the transmission conductors 34 of the powered audio bus 5 to filter and ensure that the data communication does not interfere with the power supply.

It should be mentioned that any elements of any of the figures referred to in this description may be combined to obtain an audio system 33 complying with specific requirements. Further, many elements of the figures are state of the art elements and are therefore not described in details in that they and their functions are known by the skilled person.

FIG. 10, consisting of FIGS. 10*a* and 10*b* which should be seen together, illustrates a simplified embodiment of the bus driver 1 and node 20 according to a preferred embodiment of the present invention. The bus driver 1 comprises a driver power supply 2 that supplies the nodes 20 via the powered audio bus 5 with a DC power through inductors 40.

As mentioned the bus driver 1 comprises a driver digital transmitters 17, which supplies the powered audio bus 5 with data through capacitors 41. These digital transmitters 17 has a given output impedance, which should be matched in order to not compromise the communication quality, and thereby the audio quality, in the audio system 33. To obtain this balance, a termination impedance may be coupled between the conductors 34*a*, 34*b* of the powered audio bus 5 i.e. from an electrical point of view between W1 and W2.

In practice the termination impedance is coupled between W1 and W2, preferably at the farthest node 20 connected to the bus driver 1 via a transmission line termination unit 26 comprised by the nodes 20.

The transmission line termination unit 26 preferably comprises a capacitor 41, a resistor 42 and a switch 43. Together these components may be referred to as transmission line termination unit 26 and when referring to a step of inserting the transmission line termination unit 26 reference is made to the impedance provided by the capacitor 41 and the resistor 42 by means of the switch 43 according to a particular embodiment of the invention. It should be mentioned that other components or distributed components may also be used to facilitate a suitable termination impedance.

The node 20 comprises according to a preferred embodiment of the invention the following:

Preferably a diode bridge 44 that make the connection phase tolerant (since both the digital audio data and the FSK communication are also phase tolerant).

A node power supply 35 that contains a capacitor (preferably an electrolytic, >100 uF) and other means for supplying the low voltage blocks in the node 20 (e.g. a switch mode power supply that makes 5V/3.3V/1.2V/ 1V or other supply voltages). The DC bus voltage is preferably 48V.

A transmission line termination unit 26, matched substantially with the cable impedance and powered audio bus 5 impedance by impedance 42. The transmission line termination unit 26 can be AC-coupled to the bus via capacitor 41 by using a relay, transistor, mosfet or other means 43.

A node digital receiver 28 AC-coupled to the bus via capacitors C2 (a transmitter may be provided in the same position).

A node processing unit 23, for example a digital signal processor DSP.

A generator or transceiver for FSK or similar simple communication, preferably implemented as part of the node processing unit 23, which is AC-coupled to the powered audio bus 5 via capacitors C3.

An audio amplifier 31, preferably a switching amplifier with a subsequent filter, that drives a loudspeaker 32.

Current sensors 22 that measures the current flowing through the node 20.

Means for detecting bus polarity (not illustrated).

It is advantageous that the node 20 is implemented to allow that connectors connecting the node 20 to the powered audio bus 5 can be freely placed (by the user installing the node 20) in for example a connector socket—and to allow the polarity of the conductors to change. This means that the node do not know whether A1/A2 and B1/B2 is upstream or downstream—and it does not know the polarity of the bus.

Since low-level electronics is best placed with reference to ground potential (typical designs), the current sensing task is best placed in that "domain", as illustrated by the following example: Assuming the two sense resistors on the high potential bus conductor are each a 0.05 Ohm sense resistor, i.e. a combined sense resistance of 0.1 Ohm, and the bus conducts a minimal DC sense current of 20 mA (assumed nodes 20 are idling with a low power consumption) this means a sense voltage of for example 3 mV (i.e. 2 mV from a single node downstream and 1 mV for the node itself on half the combined resistor). This small signal exist in a noisy environment, which further complicates a robust threshold mechanism.

To counteract the difficulties (offset voltage, CMRR and noise), the current sensors 22 may preferably involve one or more of for example:

Calibrate DC measurement by measuring two levels and look at difference (assuming two currents are fixed and known). This mean that bus nodes have to change between two (significant) different current consumptions (preferably sync'ed across nodes). This can be controlled from the driver 1 via communication like FSK, low bit rate digital control (which does not require a termination resistor), or other suitable communication means.

Let the bus nodes make a periodic current consumption pattern (sinusoidal). Pattern may be sync'ed from driver using for example the communication means mentioned above. The nodes can then measure the AC RMS value of the current consumption. This will attenuate (average out) noise and it will get rid of offset issues in the current sense electronics.

FIGS. 11-13 illustrate further details of embodiments of current sensors according to the invention. FIG. 11 comprises a bus power supply V1 representing the driver 1 feeding the powered audio bus with 48 VDC and a current I2 representing a downstream node drawing a current of 20 mA. Inside the present node, current I1 represents the node's own current consumption of also 20 mA in the example. The sense resistors R1-R4 connected in series with the bus conductors are as mentioned above for example 0.05 Ohm each. With the embodiment in FIG. 11 the current is sensed as a difference of the average of the current flowing in both conductors. However, in the embodiment of FIG. 11, the current sensor circuitry has a common mode voltage equal to 50% of the rail voltage, which may not be desirable when small signal electronics sits close to ground potential.

FIG. 12 illustrates a similar setup with respect to bus voltage V2, downstream node current I4, own consumption current I3 and sense resistors R9-R11, all having same values as in the example of FIG. 11. Assuming that the electronics in the loudspeaker node are powered via a diode bridge 44 as described above with reference to FIG. 10, ensures that the operational amplifier always is powered with the right polarity. Depending on bus polarity either diodes D1/D3 or diodes D2/D4 will conduct since the reference input REF receives a higher voltage potential compared to the lowest potential of the two conductors. In the case of a positive voltage potential at the upper conductor (relative to the lower conductor) in FIG. 12 will mean that diodes D2 and D4 can be considered to be non-existing. And assuming ideal diodes, the differential amplifier consisting of an operational amplifier together with resistors R15/R14/R16/R17, will measure the voltage across resistors R10 and R12, which is proportional to the current running in these resistors (lower conductor). The same thing will happen for opposite polarity on the bus, but then D2/D4 and R9/R11 will be used instead.

FIG. 13 illustrates a similar setup with respect to bus voltage V2, downstream node current I4, own consumption current I3 and sense resistors R9-R11, all having same values as in the example of FIG. 11. As with respect to the approach in FIG. 12, the diodes D1 and D3 are in practice not ideal, the voltage across them will influence the differential voltage estimate, i.e. the output on the opamp. To remove this error, the circuit in FIG. 13 can be used, which replaces the diodes with a "contact function" established with bipolar transistors using the same principle, that either Q1/Q2 or Q3/Q4 will conduct. This "contact function" can also be established using FETs, relays or any other contact function.

FIG. 14 illustrates an example of a node enumeration method according to an embodiment of the invention. The method is preferably effected upon each power up of the system, but could also be effected by a user command, or upon detection of irregularities, e.g. lack of communication from a certain node, reduced communication quality possibly caused by impedance mismatch, or other events indicating a possible disconnection of a node or break of the bus cable, or indication that a node has been added or changed.

Step S1: Nodes are instructed to invoke a pre-defined reference consumption, which is fixed and sufficient in level such that it can be detected by other nodes.

Step S2: In this step, nodes are instructed to measure the downstream consumption. As a part of this measurement, it may be advantageous for the nodes to subtract their own and/or downstream idle consumption, such that only the reference consumption from downstream nodes are measured. This idle consumption measurement can be carried out prior to step S1. If a given node measures a downstream consumption level that clearly resembles less than one reference consumption, e.g. comparable to an idle consumption, this is indicative of the given node being the farthest node on the powered audio bus among the nodes currently participating in the reference consumption, and a message preferably including an ID of the given node is sent upstream to the bus driver.

S3: In this step the bus driver waits for a node response, which will contain the node ID of a node considering itself the farthest node among the currently participating nodes based on the measurement performed in step S2.

S4: If no response has been received within a given time period, meaning that no nodes still participates in reference consumption, the bus enumeration process has been finished. If, on the other hand, a response is received the method proceeds to step S5.

S5: The bus driver instructs the node that responded in step S4 to release its reference consumption, which thereby no longer participates in the reference consumption. This enables next iteration in the enumeration process with the detected nodes being transparent due to non-consumption.

S6: The bus driver stores the received node ID in a table that corresponds to the electrical sequence of the bus.

When the node enumeration method is finished, i.e. when no response is received in step S4, the constructed ID table now corresponds to the electrical sequence of nodes on the bus. The first entry in the table corresponds to the node furthest downstream and the last entry corresponds to the node furthest upstream, i.e. nearest to the bus driver.

In various embodiment alternative iteration exit methods could be implemented, for example such that the bus driver itself measures the bus consumption, and when this measured consumption is less than a single reference consumption, it is concluded that all nodes have been detected and therefore are idling, and the iteration ends. Again, it may be advantageous to subtract the bus idle consumption to increase robustness and precision.

In a preferred embodiment, when the farthest node has been identified for example in accordance with the method described above, it is instructed by the bus driver to apply a transmission line termination as described in more detail in various embodiments above.

In a preferred embodiment, when the nodes have been enumerated and the transmission line been appropriately terminated, the bus driver and nodes may invoke a higher quality, higher rate communication protocol for efficiently distributing high quality audio and/or several audio and control channels simultaneously.

LIST

1. Bus driver
2. Driver power supply
3. Driver power converter
4. First driver filter
5. Powered audio bus
6. Driver current sensor
7. Driver audio interface
8. External audio source
9. Driver interface unit
10. External controller
11. Driver processing unit
12. Second driver filter
13. First communication channel
14. First driver analog-to-digital converter
15. Third driver filter
16. Second communication channel
17. Driver digital transmitter
18. Second driver analog-to-digital converter
19. Controller-bus interface
20. Node
21. Node-bus interface (21*a* first node-bus interface, 21*b* second node-bus interface)
22. Node current sensor (22*a* first node current sensor, 22*b* second node current sensor)
23. Node processing unit
24. First node analog-to-digital converter
25. First node filter
26. Transmission line termination unit
27. Second node filter
28. Node digital receiver
29. Third node filter
30. Node transmitter
31. Node amplifier
32. Loudspeaker 33. Audio system
34. Transmission line conductor (34a first transmission line conductor, 34b second transmission line conductor)
35. Node power supply
36. Utility unit
37. First room (37a first zone, 37b second zone)
38. Second room (38a third zone)
39. Y-splitter
40. Inductor
41. Termination capacitor
42. Termination resistor
43. Termination switch
44. Diode bridge

The invention claimed is:

1. A method for determining a connection order of at least two nodes on a powered audio bus, the method comprising the steps of:
providing a powered audio bus;
providing nodes connected to said powered audio bus, each of the nodes comprising:
a node processing unit and a node memory, the node memory being arranged to store at least a node identifier;
a node receiver and a node transmitter arranged to receive and transmit communication on said powered audio bus;
a bus power monitoring unit;
a utility unit arranged to provide a utility function of said node, the utility unit of at least one of the nodes comprising at least one loudspeaker and at least one amplifier arranged to drive said loudspeaker based on control information and audio information received from said powered audio bus by said node receiver; and
a power converter arranged to convert power from said powered audio bus to supply power to at least partly the node processing unit, the node receiver, the node transmitter and the utility unit;
providing a bus driver connected to said powered audio bus at a bus driver portion of said powered audio bus, the bus driver being arranged to feed control information and audio information into the powered audio bus, the bus driver comprising a driver processing unit and a driver memory, the driver memory being arranged to store at least said node identifiers for said nodes;
providing a bus power supply connected to said powered audio bus at said bus driver portion of said powered audio bus, the bus power supply being arranged to feed power into the powered audio bus;
arranging for a subset of the nodes to draw power from said bus power supply via said powered audio bus;
using said bus power monitoring units of said subset to determine a farthest node as one node of said subset which is connected to said powered audio bus farther away from said bus driver than any other node of said subset;
using said node transmitter and node receiver of said determined farthest node to communicate a node identifier with said bus driver so that a node identifier for said determined farthest node is stored in said node memory and said controller memory.

2. The method for determining a connection order according to claim 1, wherein said powered audio bus is implemented by one pair of unshielded or shielded twisted wire cable.

3. The method for determining a connection order according to claim 1, wherein said powered audio bus is implemented by a two conductor cable having a characteristic impedance in the range of 50Ω to 150 Ω.

4. The method for determining a connection order according to claim 1, wherein said nodes are connected to said powered audio bus in a daisy-chain configuration.

5. The method for determining a connection order according to claim 1, wherein said powered audio bus comprises at least two bus driver portions, e.g. one at each end of the powered audio bus, and individual bus driver ports of one or more bus drivers are connected to each of the at least two bus driver portions, thereby providing an audio system with redundancy, e.g. as a ring topology.

6. The method for determining a connection order according to claim 1, wherein said bus power monitoring unit is connected to said powered audio bus in series.

7. The method for determining a connection order according to claim 1, wherein said bus power monitoring unit is arranged to monitor a power-related information related to current, voltage or power selected from the list of level, difference, exceeded threshold, slope, frequency, real part, imaginary part, phase, periodicity, superposed or encoded information, or any combination thereof.

8. The method for determining a connection order according to claim 1, wherein said bus power monitoring unit of a node is arranged to monitor a power related information on both sides of said node.

9. The method for determining a connection order according to claim 1, wherein said bus power monitoring unit of a node is arranged to monitor a power related information on two conductors of said powered audio bus.

10. The method for determining a connection order according to claim 1, wherein the arranging for a subset of the nodes to draw power from said bus power supply comprises arranging the node processing units to cause a predetermined power consumption in the respective nodes.

11. The method for determining a connection order according to claim 1, wherein the predetermined power consumption causes a consumption in the node with an RMS power in the range 1-10 W.

12. The method for determining a connection order according to claim 1, wherein at least one of the nodes comprise a controllable transmission line termination unit.

13. The method for determining a connection order according to claim 12, wherein the method comprises a step of instructing the farthest node to insert said transmission line termination unit on the powered audio bus.

14. The method for determining a connection order according to claim 12, wherein the transmission line termination unit comprises at least one impedance and at least one a capacitance, the impedance value corresponding roughly to a characteristic impedance of the transmission line.

15. The method for determining a connection order according to claim 1, wherein said method further comprises the steps of:
excluding said farthest node from said subset;
repeating said method from the step of arranging for the subset of the nodes to draw power from said bus power supply until all nodes have been excluded from the subset.

16. The method for determining a connection order according to claim 1, wherein the bus power supply is a DC power supply.

17. The method for determining a connection order according to claim 1, wherein the powered audio bus is further supplied with power from a bus power injector.

18. The method for determining a connection order according to claim 1, wherein the node transmitter enables communication from the node to the bus driver.

19. A loudspeaker system comprising
a powered audio bus;
nodes connected to the powered audio bus, each of the nodes comprising:
   a node processing unit and a node memory, the node memory being arranged to store at least a node identifier;
   a node receiver and a node transmitter arranged to receive and transmit communication on said powered audio bus;
   a bus power monitoring unit;
   a utility unit arranged to provide a utility function of said node, the utility unit of at least one of the nodes comprising at least one loudspeaker and at least one amplifier arranged to drive said loudspeaker based on control information and audio information received from said powered audio bus by said node receiver; and
   a power converter arranged to convert power from said powered audio bus to supply power to at least partly the node processing unit, the node receiver, the node transmitter and the utility unit;
a bus driver connected to said powered audio bus at a bus driver portion of said powered audio bus, the bus driver being arranged to feed control information and audio information into the powered audio bus, the bus driver comprising a driver processing unit and a driver memory, the driver memory being arranged to store at least said node identifiers for said nodes; and
a bus power supply connected to said powered audio bus at said bus driver portion of said powered audio bus, the bus power supply being arranged to feed power into the powered audio bus;
wherein the nodes are arranged to draw power from said bus power supply via said powered audio bus upon instruction from said bus driver or upon their connection order not being identified by said bus driver; thereby forming a subset of said nodes drawing power in an occasion;
wherein the bus power monitoring units are arranged to determine a farthest node as one node of said subset of said nodes which is connected to said powered audio bus farther away from said bus driver than any other node of said subset;
wherein the node transmitter and node receiver of a node upon being determined as said farthest node are arranged to communicate a node identifier with said bus driver, so that a node identifier for said farthest node can be stored in said node memory and said controller memory.

20. A method of retrofitting nodes and a bus driver to an existing loudspeaker installation cable to transform it into a powered audio bus, the method comprising
providing a powered audio bus by
   connecting nodes to a previously installed loudspeaker installation cable, each of the nodes comprising:
      a node processing unit and a node memory, the node memory being arranged to store at least a node identifier;
      a node receiver and a node transmitter arranged to receive and transmit communication on said powered audio bus;
      a bus power monitoring unit;
      a utility unit arranged to provide a utility function of said node, the utility unit of at least one of the nodes comprising at least one loudspeaker and at least one amplifier arranged to drive said loudspeaker based on control information and audio information received from said powered audio bus by said node receiver; and
      a power converter arranged to convert power from said powered audio bus to supply power to at least partly the node processing unit, the node receiver, the node transmitter and the utility unit;
   connecting a bus driver to said installation cable at a bus driver portion of said powered audio bus, the bus driver being arranged to feed control information and audio information into the powered audio bus, the bus driver comprising a driver processing unit and a driver memory, the driver memory being arranged to store at least said node identifiers for said nodes; and by
   connecting a bus power supply to said installation cable at said bus driver portion of said powered audio bus, the bus power supply being arranged to feed power into the powered audio bus;
arranging for a subset of the nodes to draw power from said bus power supply via said powered audio bus;
using said bus power monitoring units of said subset to determine a farthest node as one node of said subset which is connected to said powered audio bus farther away from said bus driver than any other node of said subset; and
using said node transmitter and node receiver of said determined farthest node to communicate a node identifier with said bus driver so that a node identifier for said determined farthest node is stored in said node memory and said controller memory.

* * * * *